(12) United States Patent
Cid et al.

(10) Patent No.: US 9,546,734 B2
(45) Date of Patent: Jan. 17, 2017

(54) SELF ALIGNING SPLIT MECHANICAL SEAL EMPLOYING A SELECTIVELY ENGAGEABLE AXIAL BIASING ASSEMBLY

(71) Applicant: A.W. CHESTERTON COMPANY, Woburn, MA (US)

(72) Inventors: Edwin Cid, Bradford, MA (US); Henri V. Azibert, Windham, NH (US); Ann T. Attenasio, West Newbury, MA (US); Timothy Conklin, Lynnfield, MD (US); Howard Phillips, Queen Creek, AZ (US)

(73) Assignee: A. W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 14/101,110

(22) Filed: Dec. 9, 2013

(65) Prior Publication Data

US 2014/0159316 A1 Jun. 12, 2014

Related U.S. Application Data

(60) Provisional application No. 61/734,691, filed on Dec. 7, 2012.

(51) Int. Cl.
*F16J 15/34* (2006.01)

(52) U.S. Cl.
CPC ......... *F16J 15/3488* (2013.01); *F16J 15/3452* (2013.01); *F16J 15/3472* (2013.01); *Y10T 29/49826* (2015.01); *Y10T 29/49863* (2015.01)

(58) Field of Classification Search
CPC .... F16J 15/348; F16J 15/3404; F16J 15/3464; F16J 15/3452; F16J 15/3488; F16J 15/3472; Y10T 29/49826; Y10T 29/49863

USPC ........ 277/375, 357, 358; 267/159; 403/375, 403/376, DIG. 7, 329; 24/457, 581.1

See application file for complete search history.

(56) References Cited

U.S. PATENT DOCUMENTS

| | | | |
|---|---|---|---|
| 3,124,502 A * | 3/1964 | Radke | F16J 15/20 277/536 |
| 3,524,654 A | 8/1970 | Hasselbacher | |
| 4,410,188 A * | 10/1983 | Copes | 277/366 |
| 4,576,384 A * | 3/1986 | Azibert | 277/370 |
| 4,580,793 A | 4/1986 | Bronson | |
| 4,666,001 A | 5/1987 | Burr | |

(Continued)

FOREIGN PATENT DOCUMENTS

WO 97/04256 A1 2/1997

OTHER PUBLICATIONS

International Search Report and Written Opinion for Application No. PCT/US13/73890, 7 pages, dated Apr. 21, 2014.

(Continued)

*Primary Examiner* — Kristina Fulton
*Assistant Examiner* — Nathan Cumar
(74) *Attorney, Agent, or Firm* — Nelson Mullins Riley & Scarborough LLP; Anthony A. Laurentano

(57) ABSTRACT

A split mechanical seal for mounting to a housing containing a rotating shaft comprising a gland assembly configured for mounting to the housing and forming a chamber, where the gland assembly includes a top surface having a gland groove formed thereon. The gland groove is formed at least in part by at least one raised wall portion that extends axially outwardly from the top surface. The seal also includes a stationary seal ring having a groove or recess formed in an inner surface.

44 Claims, 10 Drawing Sheets

(56) References Cited

U.S. PATENT DOCUMENTS

| | | | |
|---|---|---|---|
| 5,039,113 A | 8/1991 | Gardner | |
| 5,114,163 A | 5/1992 | Radosav et al. | |
| 5,199,720 A * | 4/1993 | Radosav et al. | 277/370 |
| 5,571,268 A * | 11/1996 | Azibert | 277/382 |
| 5,711,532 A | 1/1998 | Clark et al. | |
| 5,716,054 A | 2/1998 | Duffee et al. | |
| 5,820,129 A * | 10/1998 | Reagan | 277/314 |
| 5,961,122 A * | 10/1999 | Marsi | 277/306 |
| 6,007,069 A * | 12/1999 | Sadowski | F16J 15/363 |
| | | | 277/374 |
| 6,076,832 A | 6/2000 | Pow | |
| 6,457,720 B1 | 10/2002 | London | |
| 6,485,023 B2 | 11/2002 | Budrow et al. | |
| 6,485,024 B1 | 11/2002 | Pippert et al. | |
| 6,814,355 B2 | 11/2004 | Bjornson | |
| 6,918,593 B2 | 7/2005 | Takahashi | |
| 7,708,283 B2 * | 5/2010 | Azibert | F16J 15/3488 |
| | | | 277/370 |
| 7,887,061 B2 | 2/2011 | Van Dyke et al. | |
| 8,091,897 B2 | 1/2012 | Giard | |
| 2002/0101038 A1 * | 8/2002 | Budrow | F04D 29/124 |
| | | | 277/370 |
| 2007/0267818 A1 | 11/2007 | Giard | |
| 2009/0019743 A1 * | 1/2009 | Nguyen | G09F 3/208 |
| | | | 40/508 |
| 2011/0221136 A1 | 9/2011 | Dudek | |

OTHER PUBLICATIONS

International Search Report and Written Opinion for Application No. PCT/US13/073926, 17 pages, dated Jul. 28, 2014.
International Preliminary Report on Patentability for Application No. PCT/US13/073926, 14 pages, dated Jun. 9, 2015.
International Preliminary Report on Patentability for Application No. PCT/US13/73890, 6 pages, dated Jun. 9, 2015.
U.S. Appl. No. 14/100,806, Edwin Cid, filed Dec. 9, 2013, mailed Oct. 19, 2015.
Extended European Search Report, European Application No. 13861407.8, dated Oct. 5, 2016, 7 pages.

* cited by examiner

SELF ALIGNING SPLIT MECHANICAL SEAL EMPLOYING A SELECTIVELY ENGAGEABLE AXIAL BIASING ASSEMBLY

RELATED APPLICATION

This application claims priority to U.S. provisional patent application Ser. No. 61/734,691, filed on Dec. 7, 2012, entitled Self Aligning Split Mechanical Seal Employing A Selectively Engageable Axial Biasing Assembly, the contents of which are hereby incorporated by reference. This application is also related to U.S. patent application Ser. No. 14/100,806, entitled Self Aligning Split Mechanical Seal Employing A Rotary Seal Ring Having Non-Flat End Faces, filed concurrently herewith, the contents of which are hereby incorporated by reference.

FIELD OF THE INVENTION

The present invention relates to a seal assembly for sealing a shaft or a rod relative to a stationary housing component. This invention relates generally to mechanical seals. More particularly, the present invention relates to universal split mechanical seals that provide for easy installation on various pump housings.

BACKGROUND OF THE INVENTION

Conventional mechanical seal assemblies are employed in a wide variety of environments and settings, such as for example, in mechanical apparatuses, to provide a fluid-tight seal. The sealing assemblies are usually positioned about a rotating shaft or rod that is mounted in and protrudes from a stationary mechanical housing.

Split mechanical seals are employed in a wide variety of mechanical apparatuses to provide a pressure-tight and fluid-tight seal. The mechanical seal is usually positioned about a rotating shaft that is mounted in and protruding from a stationary housing. The mechanical seal assembly is usually bolted to the outside of the housing at the shaft exit, thus preventing the loss of pressurized process fluid from the housing. Conventional split mechanical seals include face-type mechanical seals, which include a pair of sealing rings that are concentrically disposed about the shaft and are axially spaced from each other. The sealing rings each have sealing faces that are biased into sealing contact with each other by conventional biasing mechanisms, including biasing clips or springs. Usually, one seal ring remains stationary (i.e., the stationary seal ring) while the other ring contacts the shaft and rotates therewith (i.e., the rotary seal ring). The mechanical seal prevents leakage of the pressurized process fluid to the external environment by biasing the seal ring sealing faces in sealing contact with each other. The rotary seal ring is usually mounted in a holder assembly which is disposed in a chamber formed by a gland assembly. The holder assembly may have a pair of holder halves secured together by a screw. Likewise, the gland assembly may have a pair of gland halves also secured together by a screw. The sealing rings are often split into segments, where each segment has a pair of sealing faces, thereby resulting in each ring being a split ring that can be mounted about the shaft without the necessity of freeing one end of the shaft ends.

Conventional seal rings are initially formed as a unitary single seal element in the shape of an annulus. A pair of grooves is formed along the inner diameter portion at opposite positions and extends in the axial direction from the top to the bottom of the seal ring. These grooves are formed in the seal element using well known techniques, including the use of conventional reciprocating machines or grinding disks. Once the grooves are formed, a pressure is applied on the inside of the seal ring at a location approximately ninety degrees from the grooves in the radially outward direction sufficient to fracture and split the seal ring element along the grooves. The resultant seal ring segments have axial exposed faces that are relatively flat and smooth. Any surface irregularities are nominal and are typically solely the result of the grain structure of the seal ring material.

Prior split mechanical seals have rotary and stationary components assembled around the shaft and then bolted on to the equipment to be sealed. A rotary seal face is inserted into a rotary metal clamp after the segments are assembled around the shaft. Then, the stationary face segments and gland segments are assembled and the split gland assembly is then bolted to the pump housing.

Previous split mechanical seal designs posed several problems. A first problem with prior split mechanical seal designs relates to the insertion of the rotary seal ring into the holder assembly that is clamped around the shaft. An O-ring seals the rotary seal face to the clamped holder in an axial direction. The rotary seal face must be pushed into a tight space inside the clamped holder, and some difficulty may often be encountered. The elastomeric O-ring sealing the rotary seal face to the holder needs to be compressed for sealing, and a certain amount of force is required to insert the seal face inside the clamped holder. In addition, since the O-ring tends to grab the seal ring and inhibits sliding, the rotary seal face of prior art mechanical seal assembly designs has a tendency to "pop-out" after being inserted. Further, the movement of the O-ring when installed can result in the O-ring being disposed in an angled position, rather than a more preferred seated position relative to the rotary seal ring. From the angled position, the installer would be required to move the O-ring back to the original position, which is quite difficult to do. This process can require multiple attempts during installation to have the rotary seal face properly seated inside the clamped holder.

Another important consideration is to maintain the perpendicularity of the rotary seal face to the shaft for smooth operation. It is quite possible to have one side or split segment of the rotary seal face further inside the clamped holder than the other side. The result is an out-of-squareness condition of the rotary seal face with respect to the shaft axis. This in turn creates a back and forth motion of the stationary seal ring as it tilts from side to side in order to track the rotary seal ring with every shaft revolution. If significant enough, this can result in shortened seal life.

A further problem exists when the installer is assembling the mechanical seal around the shaft at the installation site. It is quite difficult for the installer to keep the rotary seal ring halves aligned relative to each other. Similarly, it is also difficult for the installer to keep the stationary seal ring halves aligned. As the seal rings are brought in to contact with each other, the seal ring halves float relative to each other because of their split nature. The installer must therefore constantly align the halves in order to ensure proper installation. As the remainder of the mechanical seal assembly is placed about the seal rings, the biasing mechanisms prematurely force the seal rings into contact with each other. The installer therefore must manually overcome this biasing force during installation. The consequence of these various issues is that the seal rings are constantly coming into forceful contact with each other, which often results in damage to the seal rings.

Moreover, since the axial split surfaces of the seal ring halves are relatively smooth and flat, it is also difficult for the installer to keep the faces aligned during installation.

SUMMARY OF THE INVENTION

It is therefore an object of the present invention to provide a split mechanical seal that employs rotary and stationary seal ring segments that can be easily aligned relative to each other.

It is also an object of the present invention to provide a split mechanical seal that employs structure that can selectively remove the axial biasing force applied to the one of the seal rings, such as for example the stationary seal ring, during installation.

The present invention provides an improved mechanical seal assembly for sealing a component, such as a pump or any type of rotating equipment. The mechanical seal assembly may include a rotary seal ring connected to moving components of the equipment being sealed, a stationary seal ring that creates a seal against the rotary seal ring and is connected to stationary components of the equipment being sealed, and associated assembly components. The improved mechanical seal assembly may include a rotary seal ring holder clamped around the shaft for holding the rotary seal ring in a selected position and configuration. The rotary seal ring holder is configured to facilitate installation of the rotary seal ring into the rotary seal ring holder and maintain the perpendicularity of the rotary seal face to the shaft being sealed. The rotary seal ring may include a detent for capturing and aligning a sealing element, such as an O-ring, for sealing against a radially outer surface of the rotary seal ring.

The mechanical seal of the present invention also provides for split seal ring components that have non-flat, axially extending seal ring faces that interlock with the corresponding seal ring face on the opposed seal ring segment. When placed together, the seal ring segments interlock and are hence self-aligning. The non-flat nature of the axial seal ring faces of the seal ring segments enables the segments to interact with each other in such a manner as to facilitate engagement of the segments with each other while concomitantly reducing or preventing sliding of the segments relative to each other.

The split mechanical seal also includes a holder assembly for seating and retaining the rotary seal ring element. The holder assembly has a pair of arcuate holder segments that are retained together with known fastening mechanisms. The holder segments each have a stepped radially inner surface on the annular body, where the radially inner surface includes a detent groove for allowing easy insertion of and seating an O-ring.

The split mechanical seal assembly of the present invention also includes a gland assembly having interacting, mating halves to facilitate engagement of the gland halves and to reduce or prevent sliding of the gland halves relative to each other when forces from the bolts, the equipment housing, the gasket support and/or other sources are applied to the gland assembly.

The gland assembly includes on the axially upper most or top surface a gland groove that houses in each gland segment a movable spring engaging mechanism that serves to selectively engage and disengage the biasing mechanism (i.e., clips). When disposed in the engaged position, the movable member engages the biasing element and removes the axial biasing force applied by the biasing element to the stationary seal ring. This biasing removal feature thus enables the installer to readily and easily install the seal rings around the shaft while minimizing any contact damage to the rings that may occur. When disposed in the disengaged position, the movable member moves within the groove to disengage from the biasing element, thus allowing the biasing members to engage the stationary seal ring and to apply an axially biasing force thereto. This axial biasing force serves to place the seal face of the stationary seal ring into sealing engaged contact with the seal face of the rotary seal ring.

The gland assembly also employs a plurality of biasing elements (i.e., clip assemblies) that serve to pre-mount the stationary seal ring on an inner surface of the gland assembly.

According to one practice, the present invention is directed to a split mechanical seal for mounting to a housing containing a rotating shaft. The seal comprises a gland assembly configured for mounting to the housing and forming a chamber, where the gland assembly includes a top surface having a gland groove formed thereon. The gland groove is formed at least in part by at least one raised wall portion that extends axially outwardly from the top surface. The split mechanical seal further includes a stationary seal ring seated within the chamber of the gland assembly and coupled thereto, where the stationary seal ring has a sealing surface and an opposed axially outer top surface. A holder assembly is disposed in the chamber and positioned so as to be in a cooperative sealing relationship with the gland assembly, such that the holder assembly defines a space and is capable of rotating with the shaft. A rotary seal ring is disposed within the space of the holder assembly and is coupled thereto.

According to another practice, a split mechanical seal for mounting to a housing containing a rotating shaft comprises a gland assembly configured for mounting to the housing (14) and forming a chamber, a stationary seal ring seated within the chamber of the gland assembly and coupled thereto, a holder assembly disposed in the chamber and positioned so as to be in a cooperative sealing relationship with the gland assembly, the holder assembly defining a space and capable of rotating with the shaft, and a rotary seal ring disposed within the space of the holder assembly and is coupled thereto. The stationary seal ring includes a sealing surface, an axially outer top surface disposed opposite to the sealing surface, an inner surface, and a groove formed in the inner surface.

According to another feature, the invention provides for a split mechanical seal for mounting to a housing containing a rotating shaft, comprising a gland assembly configured for mounting to the housing and forming a chamber, a stationary seal ring seated within the chamber of the gland assembly and coupled thereto, the stationary seal ring having a sealing surface and an opposed axially outer top surface, a holder assembly disposed in the chamber and positioned so as to be in a cooperative sealing relationship with the gland assembly, the holder assembly defining a space and capable of rotating with the shaft, a rotary seal ring disposed within the space of the holder assembly and is coupled thereto, and a biasing clip assembly for applying a biasing force to at least the stationary seal ring.

The biasing clip assembly includes a first inner spring clip member, and a second outer spring clip member that is sized and configured for mounting over the first inner spring clip member. The first inner spring clip member and the second outer spring clip member have a generally C-shaped configuration.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
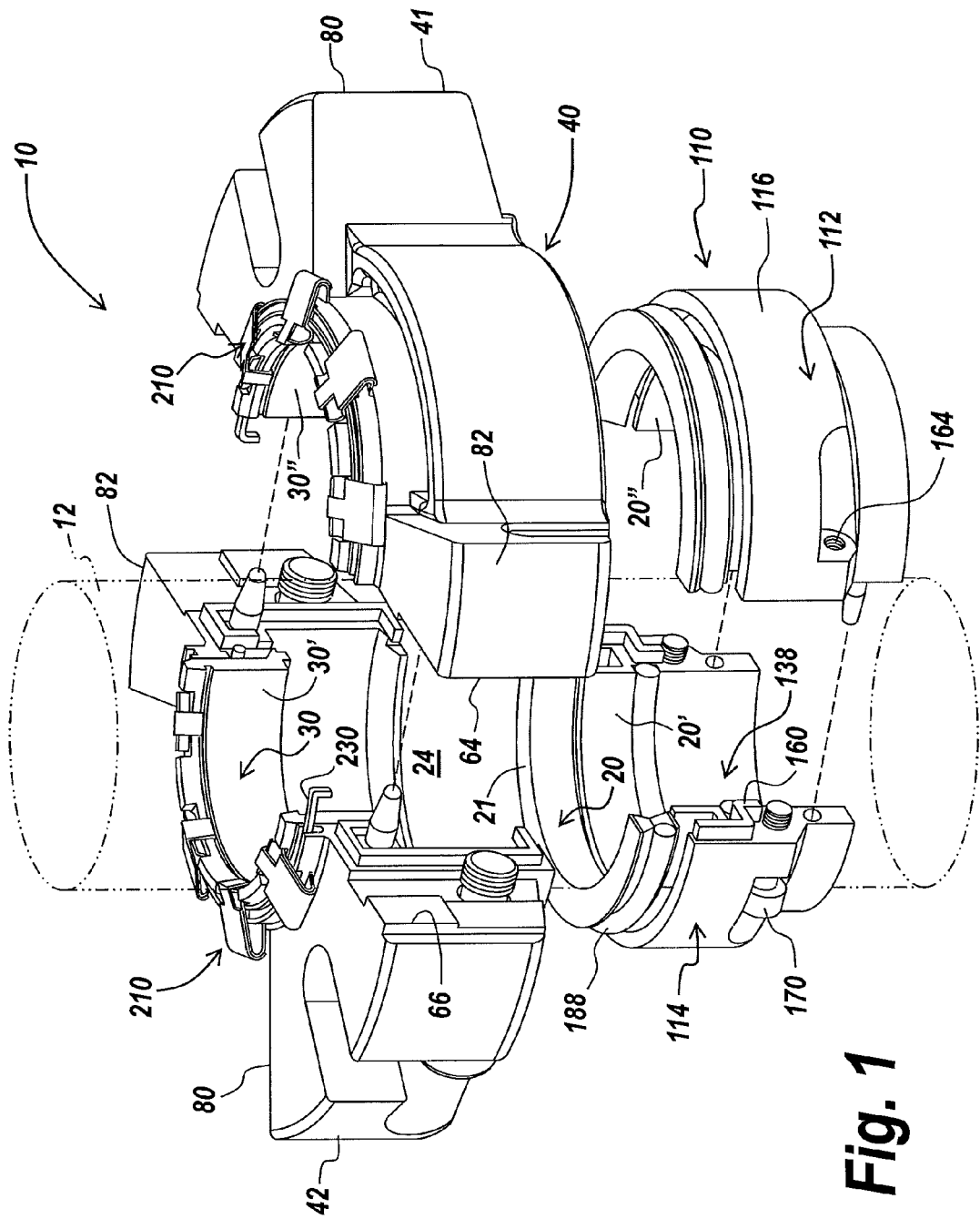
FIG. 1 is a partially assembled perspective view of a split mechanical seal separated into two segments according to the teachings of the present invention.

The present invention provides a mechanical seal assembly for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

The terms "seal assembly" and "sealing assembly" as used herein are intended to include various types of sealing assemblies, including single seals, split seals, concentric seals, spiral seals, and other known seal and sealing assembly types and configurations.

The term "shaft" is intended to refer to any suitable device in a mechanical system to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and a seal assembly disposed proximate the mechanical system employing the seal assembly. Conversely, the term "axially outer" as used herein refers to the portion of stationary equipment and a seal assembly distal from the mechanical system.

The term "radially inner" as used herein refers to the portion of the seal assembly proximate a shaft. Conversely, the term "radially outer" as used herein refers to the portion of the seal assembly distal from the shaft.

The terms "stationary equipment" and/or "static surface" as used herein are intended to include any suitable stationary structure housing a shaft or rod to which a seal having a gland is secured. Those of ordinary skill will also recognize that the gland assembly can form part of the mechanical seal or part of the stationary equipment.

The mechanical seal assembly of an illustrative embodiment of the present invention may employ an improved rotary seal ring holder for mounting and holding a rotary sealing member in a selected position within the mechanical seal assembly and/or an improved gland assembly for connecting stationary components of the mechanical seal assembly to stationary equipment and/or improved seal rings for sealing a process fluid within the stationary equipment.

The seal rings of the present invention are also constructed so as to have non-flat axially extending faces so that the seal ring segments align with each other. This enables the seal ring segments to be, in essence, self-aligning.

The gland assembly also includes on an axially upper most surface a groove that houses, in each gland segment, a movable biasing removing mechanism that serves to selectively engage and disengage a biasing mechanism (i.e., biasing clips or springs). When disposed in the engaged position, the movable member engages the biasing element and removes the axial biasing force applied by the biasing mechanism to the stationary seal ring. When disposed in the disengaged position, the movable member moves within the groove to disengage from the biasing mechanism, thus allowing the biasing members to engage the stationary seal ring and to apply an axially biasing force thereto. This axial biasing force serves to place the seal face of the stationary seal ring into sealing engaging contact with the seal face of the rotary seal ring.

The gland assembly also employs a plurality of biasing elements (i.e., clip assemblies) that serve to pre-mount and/or retain the stationary seal ring on an inner surface of the gland assembly.

The seal gland assembly of the mechanical seal assembly may employ overlapping gland halves that interlock to prevent sliding of the gland halves relative to each other during operation.

FIGS. 1-7 depict a split mechanical seal 10 according to a preferred embodiment of the present invention. The mechanical seal 10 is preferably concentrically disposed about a shaft 12 that extends along a first axis 13 and is secured to an external wall of a housing 14, FIG. 7, such as a pump or other system. The shaft 12 may be mounted, at least partly, within or adjacent to the housing. The mechanical seal 10 constructed in accordance with the teachings of this invention provides a fluid-tight seal, thereby preventing a process medium, e.g., hydraulic fluid, from escaping the housing 14. The fluid-tight seal is achieved by sealing members, illustrated as a pair of split seal rings 20 and 30. The illustrated sealing members include a first or rotary/rotating seal ring 20 and a second or stationary seal ring 30 that form a seal therebetween. Each seal ring 20 and 30 has a smooth arcuate sealing surface 21, 31, respectively. The smooth arcuate sealing surface 21, 31 of each seal ring is biased into sealing contact with the corresponding sealing surface 21 or 31 of the other seal ring. Preferably, the seal rings 20 and 30 are split into a pair of segments, respectively, to facilitate installation, as described below. The sealing surfaces 21, 31 of the seal rings provide a fluid-tight seal operable under a wide range of operating conditions, including a vacuum condition, as described in greater detail below.

Figure 4:
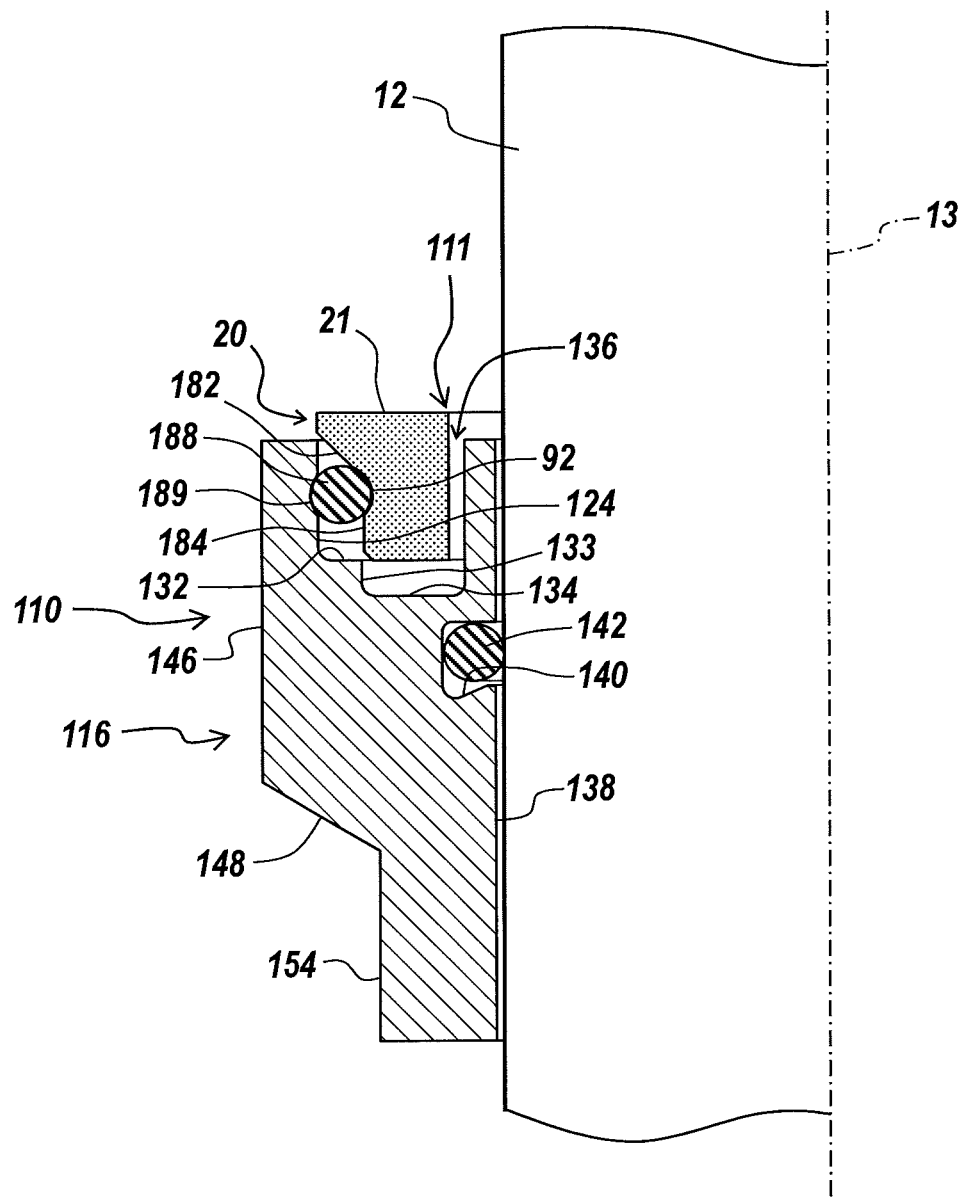
FIG. 4 is a partial fragmentary cross-sectional view of the mechanical seal of FIG. 1 illustrating the holder and rotary seal ring mounting relationships according to the teachings of the present invention.

The holder assembly 110 defines a space 111, FIG. 4, for receiving and retaining the rotary seal ring 20. The holder assembly 110 may be split to facilitate assembly and installation. In one embodiment, the holder assembly 110 comprises a pair of arcuate holder segments 112, 114 that mate to form the annular holder assembly 110. The holder assembly 110, or each arcuate holder segment if the holder assembly is split, has a radially outer surface 116 facing the gland assembly 40 and a first generally radially inner surface 124 (in addition to the inner surface 138) for sealing against the seal ring 20 and defining the space 111 for receiving and retaining the rotary seal ring 20.

A sealing element, such as O-ring 188, is concentrically disposed about the rotary seal ring 20 to seal between the rotary seal ring 20 and the holder assembly 110. As shown, the O-ring is preferably disposed about a radially outer surface 184 of an axially inner portion of the rotary seal ring 20, as described below, and seals against the radially inner surface 124 of the holder assembly 110. As described in detail below, the radially inner surface 124 of the holder assembly 110 may include a detent groove 189 for receiving and seating the O-ring 188 disposed about the rotary seal ring 20 to facilitate assembly and operation of the seal assembly and maintain the rotary seal ring 20 in an optimal position.

Other sealing members may seal the interfaces between different components of the mechanical seal assembly 10. For example, in the illustrative embodiment, a flat, annular elastomeric gasket 60 seals the interface between the seal gland assembly 40 and the housing 14. A holder gasket 160 seals the holder segments 112, 114 together, if the holder assembly 110 is split, as described below. A holder/shaft elastomeric member, illustrated as O-ring 142, seals between the rotary seal ring holder assembly 110 and the shaft 12. A stationary seal ring/gland elastomeric member, illustrated as O-ring 202, seals at an interface between the stationary seal ring 30 and the gland assembly 40 and provides radially inward pressure on the stationary seal ring 30. One skilled in the art will recognize that the mechanical seal assembly may have any suitable means for sealing between different components.

In addition, the illustrated split mechanical seal 10 also includes an anti-rotation mechanism (not shown) such as a pin or a flat surfaced element that extends axially between the rotary seal ring 20 and the holder assembly 110 to prevent relative rotary movement of the rotary seal ring and the holder assembly 110. Moreover, a centering button (not shown) can optionally be provided between the radially outer surface 116 of the seal ring holder assembly 110 and the gland assembly 40 to facilitate centering of the mechanical seal assembly around the shaft 12. Those of ordinary skill will also recognize that a first socket head screw cap of the holder screw 170 can be provided to secure together the holder assembly 110, while a second socket head screw cap secures the gland assembly 40, FIGS. 1-3. The seal 10 also includes bolts and bolt tabs (not shown) which can be used to secure the gland assembly 40 to the equipment 14.

Certain components of the mechanical seal 10 of the present invention are similar to the mechanical seal assemblies described in U.S. Pat. Nos. 5,571,268 and 7,708,283, the contents of which are herein incorporated by reference.

As further illustrated in FIGS. 1-7, the holder assembly 110 for mounting the rotary seal ring 20 is disposed in a chamber 24 formed by the gland assembly 40, and spaced radially inward therefrom. It should be understood however, that the holder assembly 110 need not be disposed within the gland assembly 40. Rather, the holder assembly 110 can be axially spaced from the gland assembly 40.

According to an alternate embodiment of the invention, and as described in U.S. Pat. Nos. 5,571,268 and 7,708,283, the holder assembly 110 can be designed and configured to facilitate installation of the rotary seal ring 20 therein, as well as overall operation of the mechanical seal, by employing a double lead-in angle. For example, the holder assembly 110 can have a radially inner surface (for example the generally inner surface 124) which is comprised of at least two sloped faces that extend from the axially outer end 121, such that the radially inner surface 124 tapers through two stages from a relatively wide opening at the axially outer end 121 to the narrower space 111 for receiving the rotary seal ring 20. As such, the radially inner surface 124 thus forms a double angled lead-in chamfer extending from the axially outer end 121 of the holder 110 along the inner wall to the detent groove 189.

As illustrated in FIGS. 4-7, the generally inner radial surface 124 further comprises an inwardly stepped surface that forms a second, axially-extending face 133. The radially inner surface 124 and the axially extending face 133 have a radially inward-extending first wall 132 formed therebetween. As shown, the inner axially extending face 133 and the radially innermost axially extending face or holder inner face 138 define an axially innermost second wall 134 therebetween. The innermost or second radially extending wall 134 defines the innermost portion of the rotary seal ring receiving space 111.

In a preferred embodiment, the O-ring 188 for sealing between the rotary seal ring 20 and the rotary seal ring holder 110 seats in a groove 189, such as a detent groove, formed on the radially inner surface 124 of the holder assembly 110. The detent groove 189 is sized, located and configured to receive a top, radially outer side of the O-ring 188 to seat the O-ring 188 relative to the holder assembly 110 during installation without compromising performance. The detent groove 189 preferably seats the O-ring 188 above the stepped wall 132. Alternatively, the detent groove 189 seats the O-ring in another location between the holder assembly 110 and the rotary seal ring 20.

Figure 2:
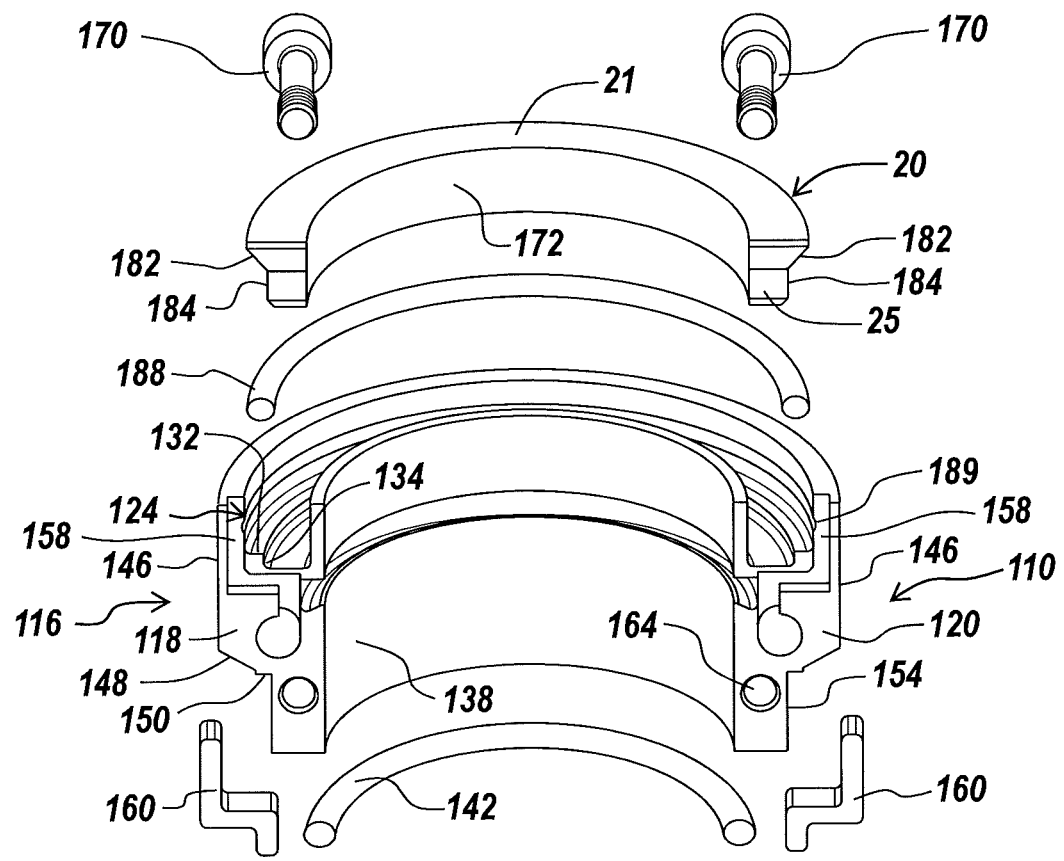
FIGS. 2 and 3 are exploded cross-sectional views of the mechanical seal of FIG. 1 according to the teachings of the present invention.

When seated in the detent groove 189, the O-ring preferably abuts the second axially sloped outer surface 182 and the radially innermost surface 184 of the rotary seal ring 20, as shown in FIG. 2.

According to the present invention, the detent groove 189 is formed on the radially inner surface 124 of the holder assembly 110. The detent groove can be placed at various locations along the surface 124 depending upon the loading force required to insert the O-ring 188 within the holder assembly. A significant advantage of the detent groove 189 and the placement of the groove on the radially inner surface 124 of the holder is that it reduces the amount of compression needed to seat the O-ring 188 in the groove.

Alternatively, the detent groove 189 may be formed on another face of the radially inner surface 124, preferably spaced from the radial wall 132 to facilitate sealing against the rotary seal ring 20.

The O-ring 188 seated by the detent groove 189 is preferably sufficiently resilient to place each of the rotary segment sealing faces in sealing contact with another segment, thereby forming a fluid-tight and pressure-tight seal upon final assembly. Specifically, when the O-ring 188 is seated within the detent groove 189, the compression on the O-ring may or may not be sufficient to create a pressure tight seal. After the gland assembly 40 is bolted to the equipment 14, the application of this additional axial force to the mechanical seal 10 drives the rotary seal ring, as well as the stationary seal ring, in an axially downward direction (arrow 240) such that the O-ring 188 is forced out of the detent groove 189. At this point the O-ring will be positioned in a cavity formed by the inner surface 124, the radial wall 132, and the detent groove 92 formed on the outer diameter of the rotary seal ring. This in essence forms a cavity that provides the necessary compression on the O-ring to create a pressure-tight seal. The O-ring 188 also functions, in cooperation with a biasing member or assembly, such as a spring, illustrated as a biasing clip assembly 210, as an axial resilient biasing means for floatingly and non-rigidly supporting the rotary seal ring 20 and the stationary seal ring 30 in axially spaced floating relation relative to the rigid walls and faces of the gland and holder assemblies 40, 110. This floating relationship was first described in U.S. Pat. No. 4,576,384, assigned to the assignee hereof, and the teachings of which are herein incorporated by reference.

The rotary seal ring 20, O-ring 188 and holder segment 112 or 114 are formed as two pre-assembled units. The detent groove 189 receives and automatically centers the O-ring 188, placing the rotary seal surface 21 into position perpendicular to the axis of the shaft 12. The described configuration of the holder reduces or eliminates the need to hold the seal face in position during installation.

The holder segment 112, the O-ring 188 and the rotary seal face segment 20' are pre-assembled to form a unit and then coupled to the other pre-assembled half about the shaft.

The detent groove 189 may be formed on a radially inner surface of the holder assembly 110 that preferably does not include the double-angled lead-in chamfer. Alternatively, this double-angled lead-in can be employed.

With reference to FIGS. 1-4, the holder segment outer surface 116 of the holder assembly 110 has a first axially extending outer surface 146, a radially inward sloping second outer surface 148, and a radially inward stepped third outer surface 154. The third outer surface 154 and the second outer surface 148 form, in combination, a radially inward extending first outer wall 150, FIG. 2. This outer wall is omitted from the other figures for simplicity of illustration. The outer surfaces of the holder assembly 110 are preferably spaced from the inner surfaces 54, 56 of the gland assembly 40, FIG. 5.

Figure 5:
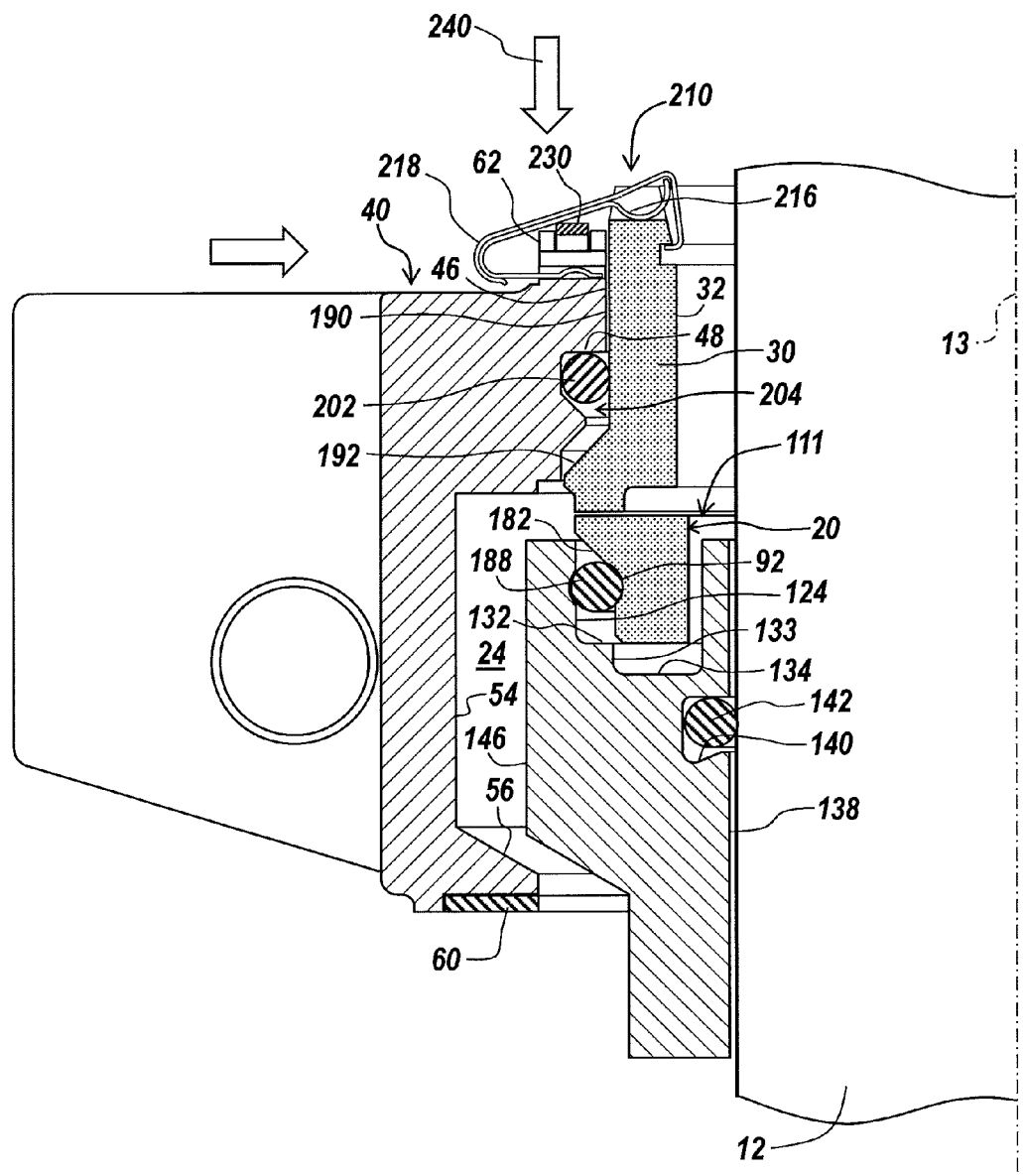
FIG. 5 is a cross-sectional view illustrating the various mounting and operational relationships of the gland, holder and rotary seal rings of the mechanical seal of FIG. 1, and further illustrating the movable spring engaging mechanism 230 disposed in the engaged position with the faces separated from each other according to the teachings of the present invention.
Figure 6:
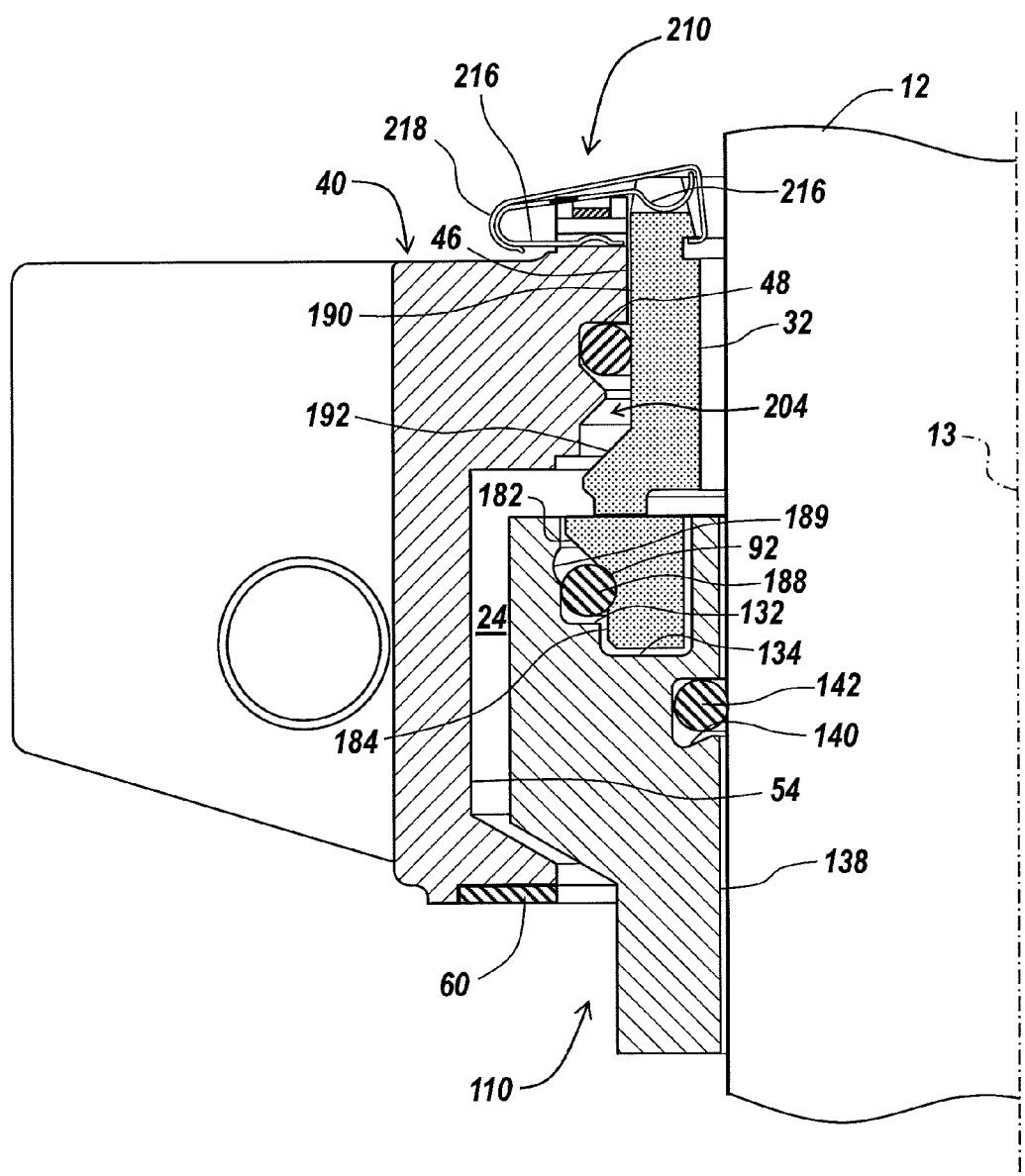
FIG. 6 is a cross-sectional view illustrating the various mounting and operational relationships of the gland, holder and rotary seal rings of the mechanical seal of FIG. 1, and further illustrating the movable spring engaging mechanism 230 disposed in the disengaged position and the O-ring 188 displaced from the detent groove and prior to the application of an axial force applied by the gland bolts, according to the teachings of the present invention.
Figure 7:
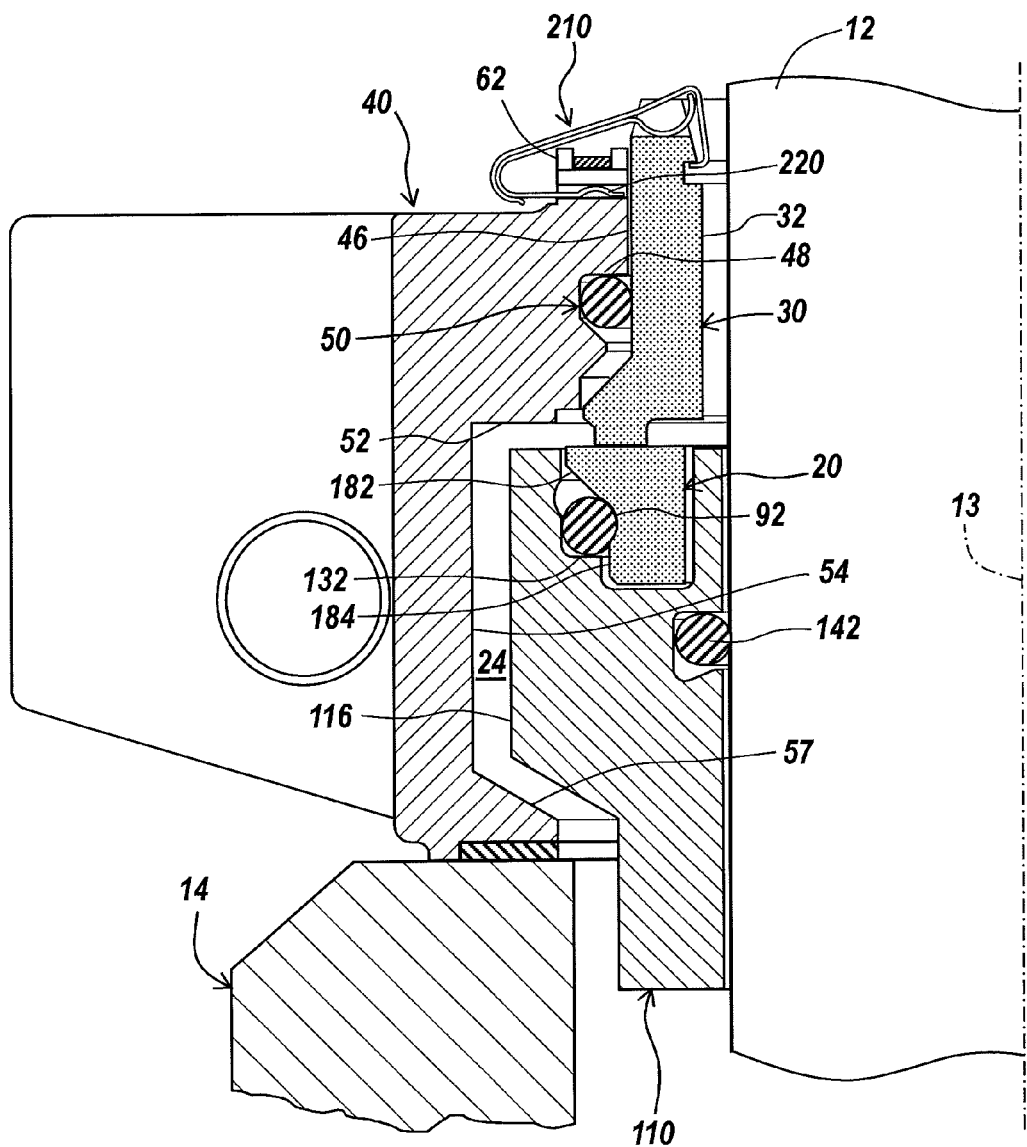
FIG. 7 is a cross-sectional view illustrating the various mounting and operational relationships of the gland, holder and rotary seal rings of the mechanical seal of FIG. 1, and further illustrating the movable spring engaging mechanism 230 disposed in the disengaged position and the O-ring 188 displaced from the detent groove and subsequent to the application of an axial force applied by the gland bolts, according to the teachings of the present invention.

As shown in FIGS. 5-7, the first axially extending outer surface 146 of the holder assembly 110 faces the axially-extending inner gland face 54 on the gland assembly 40, with the outer diameter of the first outer surface 146 being preferably less than the inner diameter of gland segment face 54. In a preferred embodiment, the outer diameter of the holder segment third outer surface 154 is less than the diameter of a face 56 of the gland segment opposite the surface 154 when the mechanical seal is assembled. This clearance allows the holder assembly 110 to seat within the gland assembly 40 for unobstructed rotational movement therein.

The fourth radially innermost face or surface 138 of the holder segment 112 has formed thereon an annular channel 140 for mounting the O-ring 142. When mounted in the channel 140, the O-ring 142 sealingly mates with the shaft 12, thus providing a fluid-tight seal along the holder and shaft interface, FIG. 4. The holder assembly has formed therein a chamber 136 bounded by the inner wall 138 and the outer wall 146. The chamber 136 is sized and dimensioned for receiving and seating the rotary seal ring 20 and the sealing element 188.

The holder segments 112, 114 may also have formed on each split holder seal face 118 and 120 and a holder gasket groove 158, FIG. 2. A holder gasket 160, complementary in shape to the groove 158, seats in the groove 158. The holder gasket 160, when seated in the groove 158, may extend beyond the holder seal faces 118, 120, as best shown in FIG. 1. The exposed portion of the gasket 160 seats in a complementary groove formed in the opposite holder segment seal face. This arrangement provides for a fluid-tight seal at pressures higher than a selected value, as described above. The gasket is preferably composed of any suitable deformable material, such as elastomeric rubber.

The holder segments 112, 114 may also have a fastener-receiving aperture 164 that mounts screw 170 for securing the holder segments 112, 114 together. The screws 170 are mounted in and positively maintained by the fastener-receiving apertures 164.

The rotary seal ring assembly 20 also may include a pair of arcuate rotary seal ring segments 20' and 20", while the stationary seal ring assembly may include a pair of arcuate stationary seal ring segments 30' and 30". Each seal ring segment has a smooth arcuate sealing surface 21, 31, respectively, and a pair of segment sealing faces 25, 35, respectively. The smooth arcuate sealing surface 21, 31 of each seal ring is biased into sealing contact with the corresponding surface, respectively, of the other seal ring segment to create a fluid-tight seal. Similarly, the segment sealing faces 25, 35 of the ring segments are biased into sealed relationship with each other to form each of the seal rings 20 and 30. Thus, these individual seal faces provide a fluid-tight seal operable under a wide range of operating conditions, including a vacuum condition.

The illustrated rotary sealing ring or element 20, illustrated as arcuate rotary seal ring segments 20' and 20", preferably has a substantially smooth arcuate inner surface 172, and an outer surface comprising several surfaces including surfaces 182 and 184 and a detent groove 92 formed therebetween, as best shown in FIGS. 2 and 4-7. The detent groove 92 formed in the rotary seal ring 20 performs at least two primary functions: first, the groove 92 helps to position the rotary seal ring in the correct location with respect to the holder assembly 110, and second, the groove 92 allows the rotary seal ring to be pre-assembled in the holder assembly by creating a double capture groove (between the holder detent groove 189 and the rotary seal ring detent groove 92) that captures the O-ring 189 therebetween while concomitantly retaining the rotary seal ring within the holder. The inner surface 172 may have formed thereon a generally rectangular notch (not shown) that mounts over a holder protrusion (not shown) for coupling the components together.

More specifically, the outer surface of the rotary seal ring has a radially inwardly sloping outer surface 182 or abutment, an inner axially extending surface 184, and a detent groove 92 formed on either surface or therebetween that is sized and configured for seating the O-ring 188. The rotary seal ring segment also preferably has the smooth arcuate sealing surface 21 disposed at the top of the ring 20. The inner diameter of the rotary seal segments inner surface 172 is greater than the diameter of the shaft to permit mounting thereon. The diameter of the rotary seal segment outer surface 184 is equal to or slightly less than the diameter of the axially extending face 133 of the holder segment, for mounting engagement with the holder assembly 110. The diameter of the rotary seal segment outer surface is less than the inner diameter of the inner surface 124 of the holder segment. One skilled in the art will readily recognize based on the teachings herein that the rotary seal ring 20 may have any suitable configuration for interfacing with and sealing against another sealing element, such as the stationary seal ring 30.

Although the illustrated seal ring 20 has an abutment 182 formed at the outer surface, those of ordinary skill will recognize that a non-sloping stepped annular surface can also be employed.

Conventional split seal ring segments have exposed axial end faces that are relatively smooth and flat. Since the axial faces are flat, they easily move relative to each other. This oftentimes makes it difficult to align the seal ring segments together during installation. According to the present invention, the rotary seal ring 20 of the present invention includes split seal ring segments 20' and 20" that have non-flat, axially extending end faces 25 that interlock with the corresponding seal ring face on the opposed seal ring segment. As used herein, the term "non-flat" is intended to cover a seal ring face that has more than a nominal amount or degree of surface feature(s) that are independent of any features that may be formed on the split surfaces as a result of the grain structure of the material of the seal rings. The axial end faces are deemed to be non-flat if a surface feature other than natural material grain vagaries exist on the axial end face 25 when the face is viewed in either or both the axial direction, from the axially outermost to the axially innermost surface of the axial end face, and the radial direction, from the radially outermost to the radially innermost axial end face. For example, the axial end faces can have a non-flat surface feature that has an inclined shape, a declined shape, a V-shape, a zig-zag style shape (when viewed in cross-section), a curved or non-linear shape, or any other suitable non-flat shape. The present invention also contemplates having a plurality of surface features formed on the end face either above or below (or both) the surface of the axial end face. The opposed axial end face on the opposed seal ring segment when disposed in confronting relationship relative to each other preferably has a shape that is complementary to this shape. When placed together, the seal ring segments interlock and are hence self-aligning. The non-flat nature of the axial seal ring faces of the seal ring segments enables the segments to interact with each other in such a manner as to facilitate engagement of the segments with each other while concomitantly reducing or preventing sliding of the segments relative to each other. The configured non-flat axial end faces 25 also help ensure that the seal face 21 of the segments are aligned to provide a relatively high degree of seal face "trueness" or face flatness sufficient to prevent the inadvertent seepage of process fluid from the seal faces. Using this technique, the split mechanical seal can achieve face flatness on the order of 80 micro-inches or less.

Figure 8A:
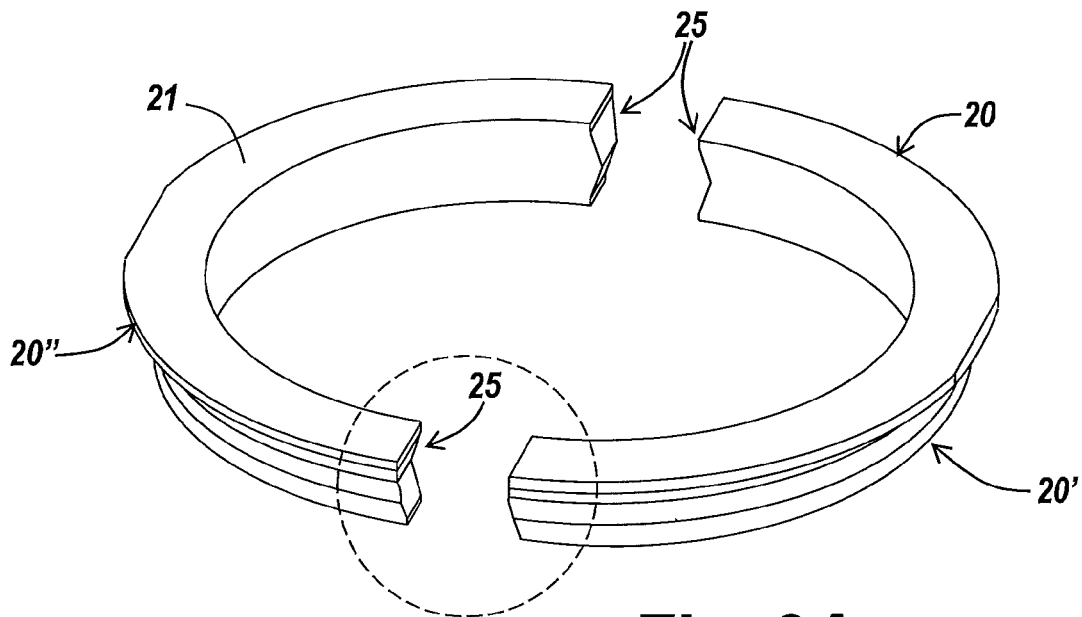
FIG. 8A is a perspective view of the rotary seal ring 20 of the mechanical seal of FIG. 1 according to the teachings of the present invention.
Figure 8B:
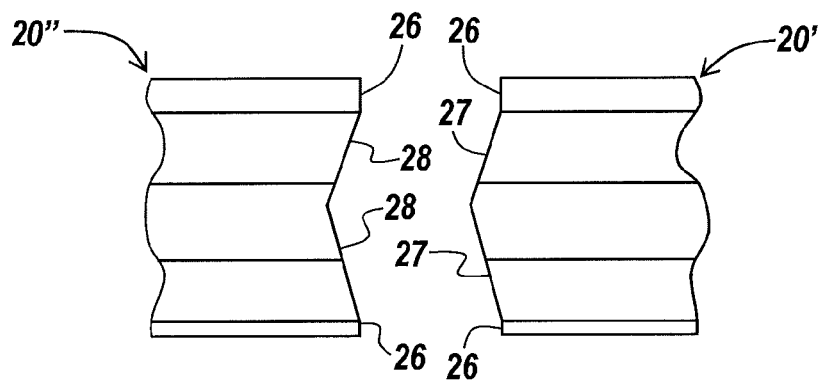
FIG. 8B is an exploded view of the axial end faces of the rotary seal ring of FIG. 8A according to the teachings of the present invention.

As illustrated in FIGS. 8A-8B, and according to a first embodiment, the axial end faces 25 of the seal ring segments 20', 20" have a non-flat surface feature formed thereon. Although the rotary seal ring 20 is illustrated as having this feature, those of ordinary skill will readily recognize that the stationary seal ring 30 can also employ this feature, although it is not required. The axial end face 25 of the seal ring segment 20' includes, when viewed in the radial direction, from the radially outermost surface towards the radially innermost surface, a first flat surface 26 that transitions to a surface feature. The illustrated surface feature has an inverted V-shape that has first and second straight inclined surfaces 27, 27 that meet at an apex point above or away from the flat surface. The axial end face then includes a radially inwardly-most flat surface 26. As illustrated, this raised surface feature having inclined surfaces 27, 27 forms a non-flat surface feature on the axial end face that would otherwise be planar (i.e., flat) with the flat surfaces 26, 26. The illustrated inclined surfaces have an included angle (or obtuse angle) that can be anywhere in the range between about 130° and about 160°.

The other ring segment 20" has an axial end face 25 that is opposite to the end face on segment 20' with the raised surface feature. The end face is shaped according to the present invention to have a complementary surface feature. As illustrated, the end face has a flat surface 26, and a pair of straight declining surfaces 28 that meet inwardly at a point to form the surface feature. When paired together, the opposed axial end faces 25 of the segments 20' and 20" interlock so as to help prevent relative movement to each other in the axial direction. The interlocking surface features thus help the seal ring segments to self-align, and hence make it relatively easy for the installer to mount and align the seal ring segments.

The other axial end face on the seal ring segment 20' can have, according to one embodiment, a surface feature that is complementary in shape. This shape arrangement can also be seen on the other seal ring segment 20", FIG. 8A.

Figure 8C:
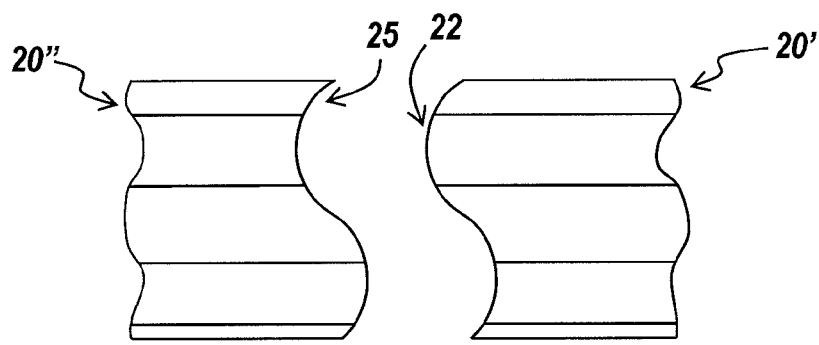
FIG. 8C is an exploded view of the axial end faces of an alternate embodiment of the rotary seal ring of FIG. 8A according to the teachings of the present invention.
Figure 9:
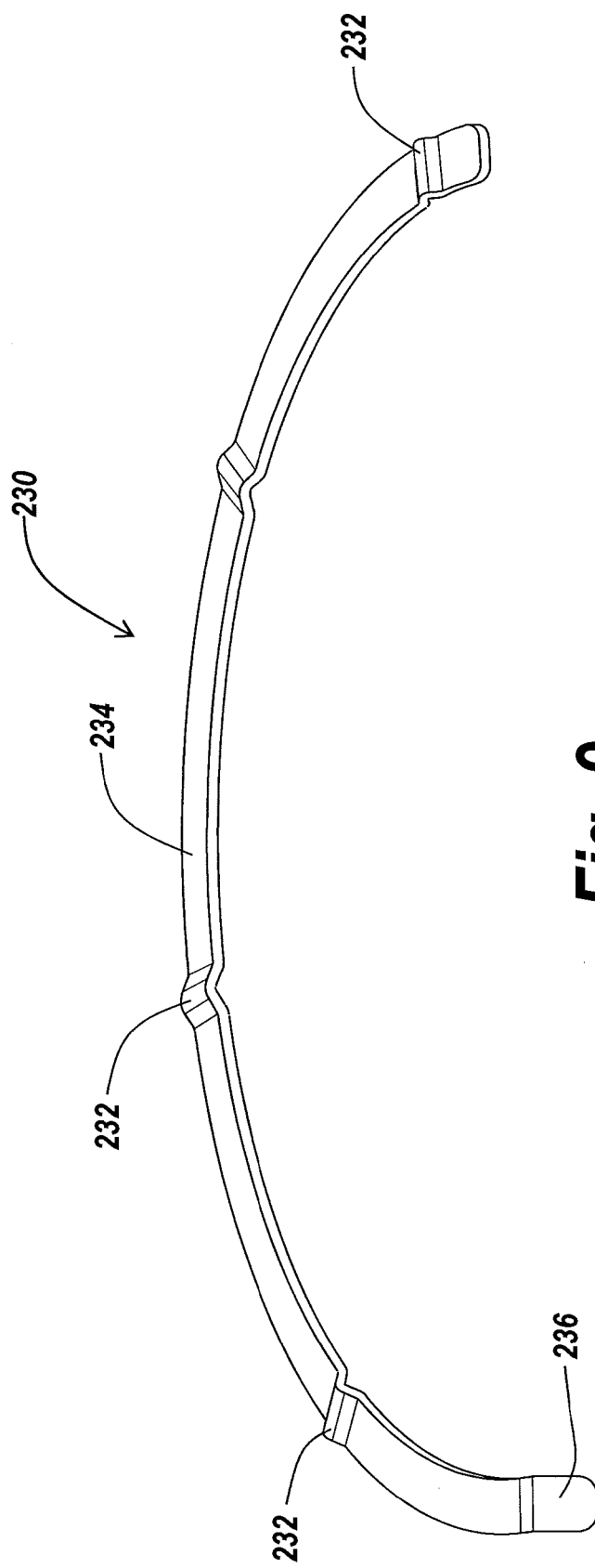
FIG. 9 is a perspective view of the movable spring engaging mechanism 230 of the mechanical seal of FIG. 1 according to the teachings of the present invention.
Figure 10A:
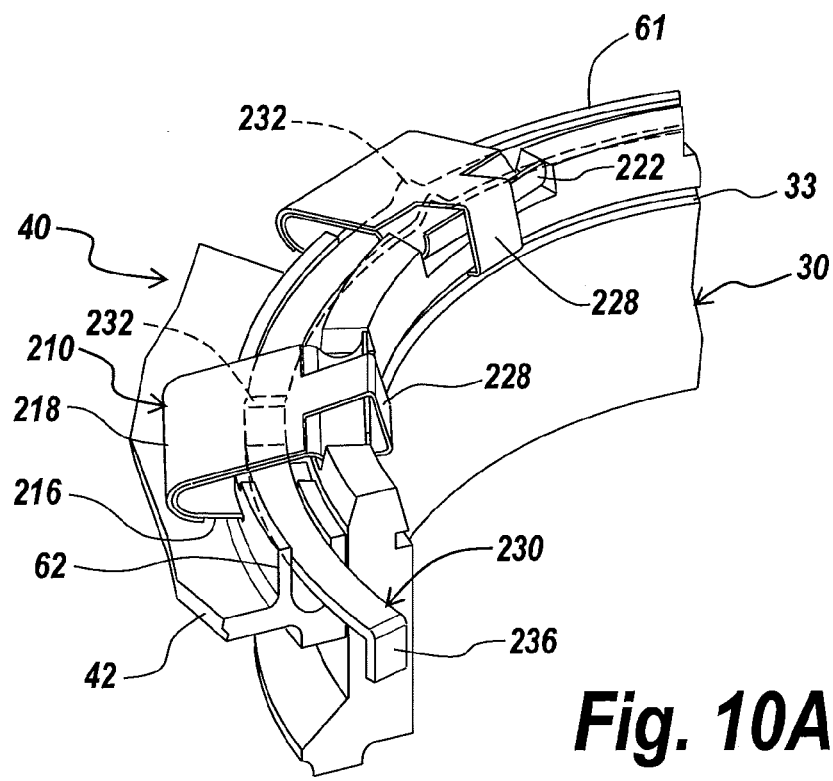
FIG. 10A is a partial fragmentary cross-sectional view of the mechanical seal of FIG. 1 illustrating the movable spring engaging mechanism 230 being disposed in the engaged position according to the teachings of the present invention.
Figure 10B:
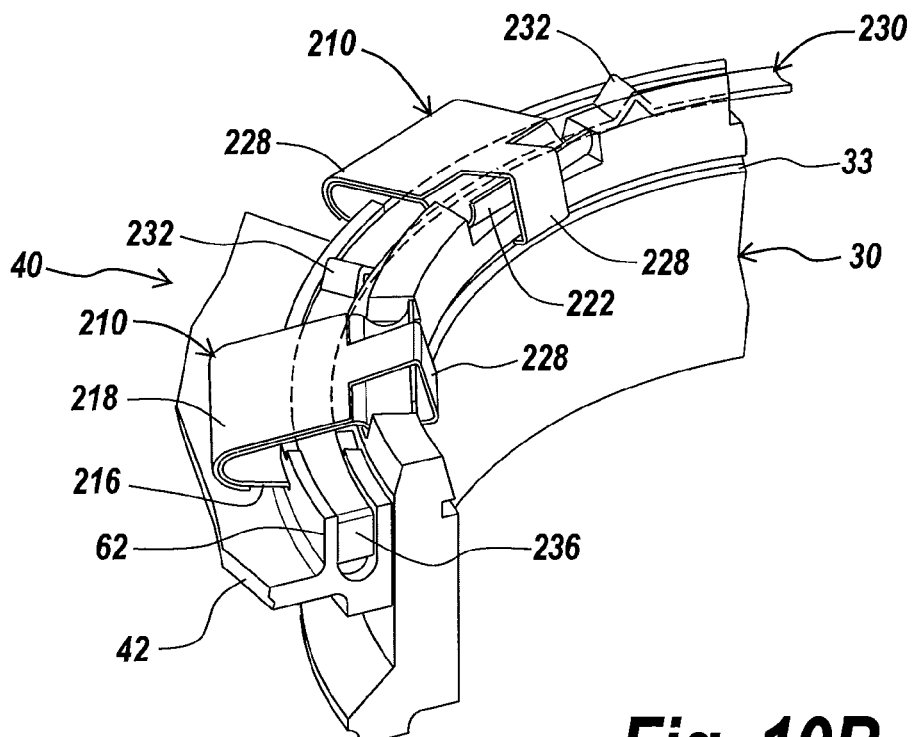
FIG. 10B is a partial fragmentary cross-sectional view of the mechanical seal of FIG. 1 illustrating the movable spring engaging mechanism 230 being disposed in the disengaged position according to the teachings of the present invention.

As set forth above, the non-flat surface features of the present invention differ significantly from the prior techniques since the fracturing process no longer relies upon a straight groove formed on the inner diameter of the seal ring in order to form the relatively flat (planar) end faces characteristic of prior art seal ring designs. Rather, the present invention contemplates the use of non-straight grooves formed along the inner diameter of the seal ring, where it was previously not desired to form these types of surfaces on the axial end faces of the seal ring segments. As a result, the axial end faces of the prior art seal ring segments could not be automatically aligned (i.e., were not self-aligning). As such, the surface features formed on the seal rings of the present invention can be formed using a laser etching system or by using a wire electrical discharge machining (EDM) technique. The use of laser etch or EDM techniques can form a number of different non-flat surface features on the axial end face of the seal ring segments. As illustrated in FIG. 8C, a non-straight, serpentine shape 22 can be formed on the axial end face 25 of the seal ring segment 20'. Other shapes can also be formed. Similar to above, the shape formed on the axial end face of the opposed seal ring segment 20" is complementary in shape.

The illustrated mechanical seal 10 includes, in addition to the rotary seal ring 20 and the stationary seal ring 30, a seal gland assembly 40 for mounting stationary seal components to the equipment 14, and a seal ring holder assembly 110 for mounting the rotary seal ring 20, described in further detail below.

The seal rings of the present invention can be formed from any material suitable for its environment and for its intended purpose. Examples of material suitable for use as seal rings in the split mechanical seal of the present invention include silicon carbide and carbon.

As best shown in FIGS. 1, 3 and 5-7, the illustrated stationary seal ring 30 may similarly include a pair of arcuate seal ring segments 30' and 30", each identical or substantially identical to the other. The illustrative arcuate stationary seal ring segments have a substantially smooth arcuate inner surface 32 extending parallel to the first axis 13 and an outer surface 36 of the seal ring, FIG. 3. The inner surface 32 has formed along the inner wall a continuous circumferentially extending recess or groove 33 that is sized and configured for receiving a portion of the biasing clip assembly 210, described in further detail below, for mounting and retaining the stationary seal ring 30 to the gland assembly 40. The groove can be continuous or non-continuous. If non-continuous, the groove can be formed as a series of recesses that are spaced apart along the inner surface. The stationary seal ring segment outer surface 36 preferably has an axially extending first outer surface 190 that terminates in a radially outward extending abutment 192. The stationary seal ring 30 preferably has an axially outer (relative to the housing 14) top surface 194 and a smooth axially inner arcuate ring sealing surface 31 disposed at the bottom of the ring. The top surface has a series of recesses 196 formed along the top surface that are sized and configured for selectively seating and/or engaging at least a portion of the biasing clip assembly 210. This arrangement helps align and seat the stationary seal ring 30 in the chamber 24, as well as functioning as a mechanical impedance for preventing the stationary seal ring 30 from rotating with the shaft 12 and the rotary seal ring 20.

The inside diameter of the stationary segment inner surface 32 is greater than the shaft diameter, and can if desired be greater than the diameter of the inner surface 172 of the rotary seal ring 20, thereby allowing relative motion therebetween. Therefore, the stationary seal ring 30 stays stationary while the shaft 12 rotates. An elastomeric member, e.g., O-ring 202, provides a radially inward biasing force sufficient to place the segment sealing faces 35 of the stationary seal ring segment 30' and 30" in sealing contact with the other stationary seal ring segment. Additionally, O-ring 202 forms a fluid-tight and pressure-tight seal between the gland assembly 40 and the stationary seal ring 30. The O-ring 202 seats in a first mounting region 204, FIGS. 5-7, defined by the gland first wall 48, the gland stepped second face 50, and the stationary ring outer surface 190. In a preferred embodiment, the abutment 192 forms an angle relative to the stationary ring outer surface 190 preferably in the range of about 30° to about 60°, and most preferably about 45°. The stationary seal ring 30 is preferably composed of a carbon or ceramic material, such as alumina or silicon carbide and the like.

The biasing member or assembly of the split mechanical seal of the present invention, illustrated as a biasing clip assembly 210 in the illustrative embodiment, also functions as an axial biasing means by providing resilient support for the stationary and rotary seal rings 20, 30 by axially biasing the seal rings such that the stationary and rotary sealing surfaces 21 and 31 are disposed in sealing contact with each other. As illustrated in FIGS. 5-7, the seal rings 20, 30 are floatingly and non-rigidly supported in spaced floating relation relative to the rigid walls and faces of the gland and holder assemblies 40, 110. This floating and non-rigid support and spaced relationship permits small radial and axial floating movements of the rotary seal segments and the stationary seal segments with respect to the shaft 12, while still allowing the rotary sealing surface 21 to follow and to be placed in sealing contact with the smooth arcuate sealing surface 31 of the stationary seal ring 30. Thus, the rotary and stationary seal ring sealing surfaces 21 and 31 are self-aligning as a result of this floating action.

Figure 3:
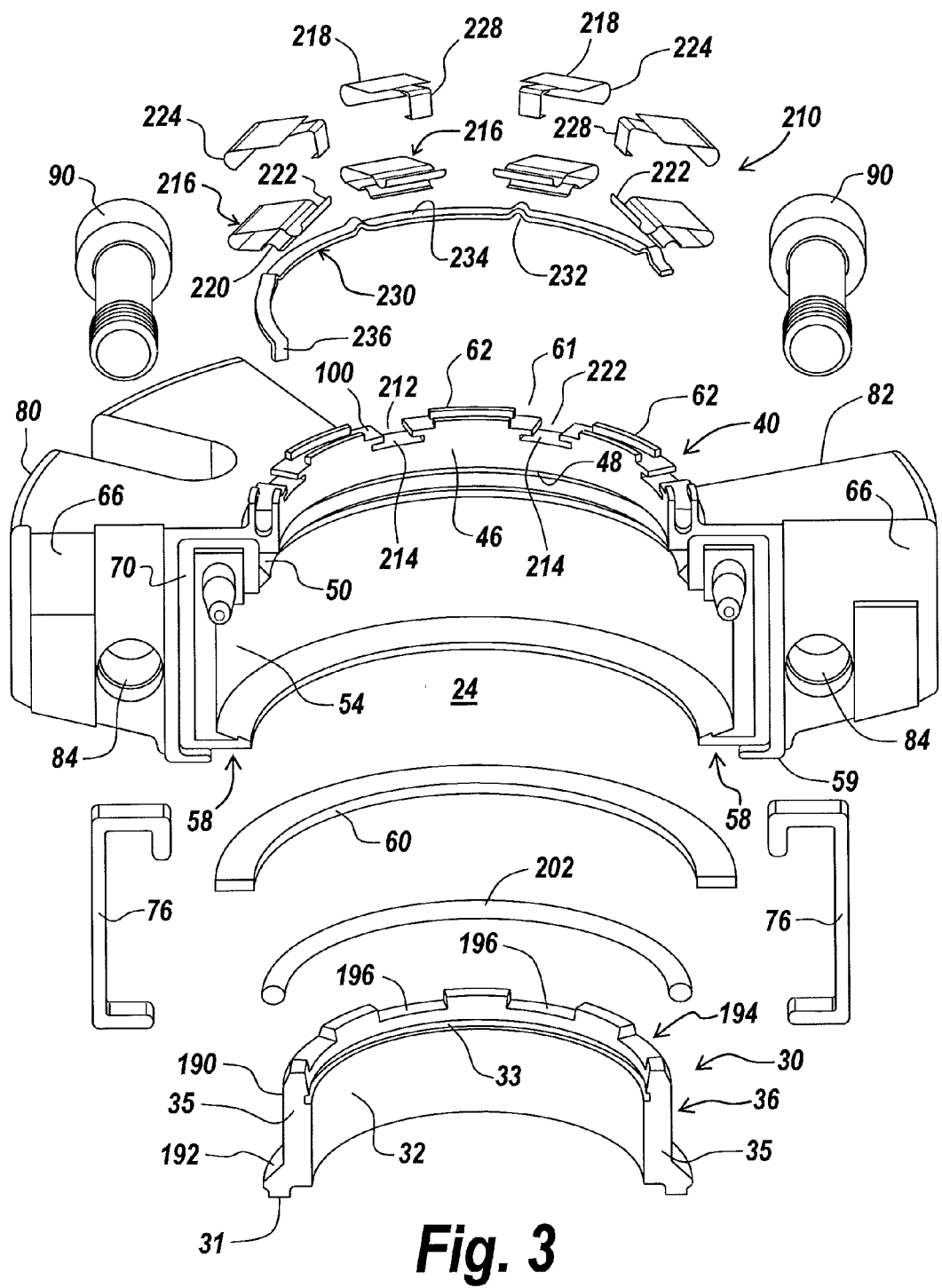

The illustrative mechanical seal assembly 10 may also include an improved seal gland assembly 40 to improve operation of the seal assembly, as shown in FIGS. 1 and 3. The illustrative seal gland assembly 40 has a pair of arcuate gland segments 41, 42 that mate to form the annular seal gland assembly 40. The gland segments are configured to engage each other to facilitate assembly and operation of the mechanical seal assembly. The illustrative gland assembly segments 41, 42 have an interlock mechanism to facilitate engagement of the two segments 41, 42. In contrast to prior gland designs, each gland segment 41, 42 has at least one non-flat, shaped interfacing surface or axial end face 64, 66 to transmit a bolting force to the other mating gland half and to prevent sliding of the gland halves relative to each other. In the illustrative embodiment, the gland segment interfacing surfaces have stepped faces forming interlocking protrusions and recesses, respectively formed on at least one interface between the two segments. Each protrusion fits into the corresponding recess such that an overlap between the two segment interfacing surfaces forms to engage the corresponding gland segment. Preferably, the flat, axially extending surfaces, which mate to form the overlap, extend substantially perpendicular to the longitudinal axis 13 of the mechanical seal assembly, thereby allowing a bolt force translated to the gland segments to transmit to the other gland segment without causing separation of the gland segments. One skilled in the art will recognize that the protrusions and corresponding recesses may have any suitable configuration. Moreover, the raised surface transmits the bolting force applied to the gland and facilitates connection and alignment of the gland segment halves. The overlapping components reduce and/or prevent a separation force at the gland splits caused by bolt glands that bolt the gland assembly to the equipment housing. The details of the split interlocking face of the gland segments is described in detail in U.S. Pat. No. 7,708,283, the details of which were previously incorporated by reference.

Referring to FIGS. 3-7 and 10A-10B, and particularly FIG. 7, each illustrative gland segment 41, 42 may have an inner surface that has a first face 46, and an integrally formed and stepped second face 50 that extends radially outward from the first face 46. The first face 46 and the second face 50 form, in combination, a first connecting annular wall 48. The second face is contoured so as to seat the O-ring 202 that surrounds the stationary seal ring 30. A stepped third face that forms the gland inner surface 54 extends radially outward from the second face 50 and forms, in combination therewith, a second annular connecting wall 52, which may be stepped, and/or include a sloping surface extending to the second face 50. A sloped fourth face 57 extends radially inward from the gland segment third face 54. The gland segment inner surface formed by faces 46, 50, 52, 54 and 57 defines the space 24 for receiving the holder assembly 110, as described above.

Each gland seal face 64, 66 may also have formed thereon a gland gasket groove 70, FIG. 3. An elastomeric gland gasket 76, complementary in shape to the gland groove 70, seats in the groove 70 of the gland. The gasket 76, when seated in the groove 70, may extend beyond the gland end faces 64, 66, as best shown in FIG. 1. The exposed portion of the gasket 76 is captured in a complementary groove formed on the split gland seal face of the other gland segment 41 when the gland segments 41, 42 are assembled. Capturing both ends of the gasket 76 between opposing split gland seal faces prevents the gasket 76 from extruding into the gap formed between the split gland seal faces when subjected to pressures higher than a selected maximum pressure. This double-capturing feature thus allows the gland segments 41, 42 to withstand greater pressures without developing pressure leaks, as well as relaxing the mechanical tolerances of other components of the mechanical seal 10. The gland gasket 76 is preferably formed from any suitable resilient material, such as elastomeric rubber. Further, although the gasket 76 has the illustrated shape, those of ordinary skill will recognize that the gasket 76 and its corresponding groove 70 can have any suitable geometric configuration.

As illustrated in FIGS. 1 and 3, each of the gland segments 41, 42 may also have integrally formed therewith a pair of screw housings 80, 82. Each screw housing has a transverse fastener-receiving aperture 84 formed substantially therethrough. The transverse aperture 84 mounts a screw 90 having the illustrated configuration. Each screw 90 fastens together the screw housings 80 and 82. As is previously disclosed in the U.S. Pat. No. 7,708,283, the screw 90 is positively maintained in the fastener aperture 84.

The seal gland assembly 40 may also have a housing gasket groove 58 formed along a bottom 59 of the gland assembly 40. The groove 58 seats the flat, annular elastomeric gasket 60.

The holder assembly 110, the gland assembly 40, and the screws 90 can be formed from any suitably rigid material, such as stainless steel.

As illustrated in FIGS. 3, 5-7, and 9-10A, the top 61 of the seal gland assembly 40 preferably includes a gland groove 100 formed thereon for retaining or seating a movable spring engaging mechanism 230. The groove is formed in part by a raised wall portion extending outwardly from the top surface 61. The raised wall portion can be continuous or non-continuous, and is preferably non-continuous. The groove is formed preferably in part by a series of spaced apart, discrete, and opposed raised wall portions 62 that extend axially outwardly from the top surface 61 of the gland. The raised wall portions have a defined length and are circumferentially spaced apart from each other along the circumference of the gland assembly to form biasing clip engaging portions 212 therebetween. The raised wall portions also allow the movable spring engaging mechanism 230 to move therebetween. The raised wall portions can be evenly spaced apart along the circumference of the gland assembly or any other suitable spacing arrangement can be used. The biasing clip engaging portions 212 have a cut-out portion 214, FIG. 3, that is sized and dimensioned to seat a portion of the biasing clip assembly when assembled. The cut-out portion can have any suitable shape, and preferably has an inverted T-shape.

According to a preferred embodiment, the series (plurality) of raised wall portions 62 include a first plurality of raised wall portions that are arranged along an inner circumference of the gland assembly. The inner circumference circumscribes a circle having a first diameter. The series of raised wall portions 62 further include a second plurality of raised wall portions that are arranged along an outer circumference of the gland assembly, and as such circumscribe a circle that has a second diameter that is larger than the first diameter. According to a preferred embodiment, the first plurality of raised wall portions are radially aligned with the second plurality of raised wall portions in the radial direction.

The illustrated movable spring engaging mechanism 230 is a relatively flat arcuate element that includes a main body portion having a series of spaced apart surface features 232 formed on a top surface 234 thereof. The surface features are preferably evenly spaced apart although other spacing arrangements can also be employed. The surface features are configured and adapted to engage and lift the biasing clip assemblies 210 when in use. The surface features can be integrally formed with the body of the movable spring engaging mechanism, such as by press stamping of other known techniques. Alternatively, the surface features can be a separate element that is mounted or fixed to the top surface 234 of movable spring engaging mechanism 230. Those of ordinary skill in the art will readily recognize that any suitable element having any suitable shape can be mounted to the engaging mechanism to form the surface feature. The movable spring engaging mechanism 230 is preferably shaped in an arcuate manner similar to the shape of the groove 100. The mechanism 230 is also sized in terms of length to fit within the groove when fully seated therein.

The movable spring engaging mechanism 230 also includes at a first exposed terminal end a bent flat portion 236 that functions as a seal gland engaging portion and is adapted to engage, when in use, an axial seal face of an oppositely disposed seal gland segment. For example, as illustrated in FIG. 1, the bent flat portion of the movable spring engaging mechanism 230 mounted in the groove formed in gland segment 42 is adapted in use to engage with the axial end face 64 of the seal gland segment 41. Those of ordinary skill will readily recognize that the seal gland engaging portion can have any suitable shape or configuration provided that it engages with the axial end face of the seal gland segments and is capable of moving the movable spring engaging mechanism 230 within the gland groove 100, as described in further detail below.

The movable spring engaging mechanism 230 is adapted to engage and lift the biasing clip assemblies 210, thus removing the axial biasing force applied by the biasing element to the stationary seal ring. This biasing removal feature thus enables the installer to readily and easily install the seal rings around the shaft while minimizing any contact damage to the rings that may occur. The movable spring engaging mechanism 230 is adjustable or movable between an engaged position where the surface features 232 are disposed beneath and engage with the biasing clip assemblies 210 (see e.g., FIG. 5) and a disengaged position where the surface features 232 are disposed circumferentially adjacent to and do not contact or engage the biasing clip assemblies (see e.g., FIGS. 6-7). When disposed in the engaged position, the movable member engages the biasing element and removes the axial biasing force applied by the biasing element to the stationary seal ring. This biasing removal feature thus enables the installer to readily and easily install the seal rings around the shaft while minimizing any contact damage to the rings that may occur. When disposed in the disengaged position, the movable member moves within the groove to disengage from the biasing element, thus allowing the biasing members to engage the stationary seal ring and to apply an axially biasing force thereto. This axial biasing force serves to place the seal face of the stationary seal ring into sealing engage contact with the seal face of the rotary seal ring.

The split mechanical seal of the present invention preferably employs a series of biasing clip assemblies 210 that are mounted on the axially outermost end of the gland assembly 40. Since the biasing clip assemblies are identical, we need only describe herein one of the clip assemblies. The biasing clip assembly 210 preferably employs a pair of generally C-shaped spring clips defined as an inner spring clip 216 and an outer spring clip 218. The inner spring clip 216 has a first lower end that has a ridge portion 220 that seats within the cut-out portion 214. The engagement of the ridge portion of the inner spring 216 with the cut-out portion 214 formed in the top surface of the gland helps retain the inner spring clip therein and helps attach the biasing clip assembly 210 to the gland assembly 40. The inner spring clip 216 further includes at an opposite end a bent portion 222 that seats within the biasing spring engaging portion 212 of the top surface of the gland. The bent portion contacts the top surface of the stationary seal ring, and specifically the recess portion 196 formed on the top surface of the seal ring to provide an axial biasing force thereto. The bent portion thus functions as an axial biasing member for applying an axial biasing force to the seal ring components. The axial biasing force as is known to those of ordinary skill in the art is a downward directing force, illustrated by the downward arrow 240 of FIG. 5, that helps place the seal faces 21, 31 of the seal rings 20, 30, respectively, in sealing contact with each other.

The biasing clip assembly 210 also includes an outer spring clip 218 that is adapted to be mounted over the inner spring clip 216. The outer spring clip 218 includes a generally rounded first end portion 224 that is configured to be mounted on and engage the outer surface of the inner spring clip, as illustrated. The outer spring clip includes an opposite end that has a bent tab portion 228 extending outwardly therefrom. The bent tab portion is configured to overlay the bent portion 222 of the inner spring clip and to connect to and engage the recess 33 formed along the inner surface of the stationary seal ring 30. The bent tab portion of the outer spring clip 218 retains or mounts the stationary seal ring 30 to the gland assembly 40. By retaining or mounting the stationary seal ring to the gland assembly, these components can come pre-assembled, which helps facilitate easy installation of the split mechanical seal 10.

Those of ordinary skill will readily recognize that the inner and outer spring clips 216, 218 can have any suitable shape or configuration provided that they are retained in the gland assembly, couple the stationary seal ring to the inner surface of the gland, and apply an axial biasing force to the stationary seal ring.

In assembly and during operation, the rotary seal segments 20' and 20" are coupled together by aligning the surface features formed on the axial end faces 25 of the seal ring segments together, FIGS. 8A-8B. The surface features formed on the axial end faces help align the seal ring segments together and help prevent relative sliding of the segments relative to each other in the axial direction. The configured non-flat axial end faces also help ensure that the seal face 21 of the segments are aligned to provide a relatively high degree of seal face "trueness" or face flatness sufficient to prevent the inadvertent seepage of process fluid from the seal faces.

Each of the O-ring 188 segments are concentrically disposed about the rotary seal segments 20' and 20", and are preferably disposed in contact with the rotary seal outer surfaces 182, 184 and the rotary seal ring detent groove 92 to form the rotary seal ring pre-assembly. The rotary seal ring pre-assembly is then inserted into the holder assembly segments until the O-ring seats within the groove 189, FIG. 4 to form the holder ring pre-assembly units. The pre-assembly units are then disposed about the shaft 12. A coupling mechanism, such as a drive flat, can be employed to rotationally couple the rotary seal ring to the holder assembly for relative rotation therewith. The coupling mechanism can be disposed on either the holder assembly or the rotary seal ring, and in a preferred embodiment, is disposed on both the rotary and stationary seal rings.

As described above, the detent groove 189 of the holder assembly receives and retains the O-ring 188 and the associated rotary seal ring 20 in an optimal position. The O-ring 188 provides an inward radial force sufficient to place the axial seal faces 25 of the rotary seal ring segments in sealing contact with each other. The holder segments 112,114 are then secured together by tightening the screws 170 that are positively maintained in the fastener-receiving apertures 164. As shown in FIGS. 5-7, the rotary seal ring segments 20', 20" are spaced from the holder assembly inner surfaces 124, and are non-rigidly supported therein by the O-ring 188, thereby permitting small radial and axial floating movements of the rotary seal ring 20.

With regard to the gland and stationary seal ring assembly, the multiple biasing clip inner clips 216 are first mounted along the perimeter or circumferential edge of the top surface 61 of the gland assembly. The ridge portion 220 of the first end of the inner spring clip 216 is initially mounted in the cut-out portion 214 formed in the top gland surface. The opposed bent end portion 222 is then seated in the biasing clip engaging portion 212. The stationary seal ring 30 is then pre-assembled with the gland assembly. The O-ring 202 is first placed about the stationary seal ring segments and then the seal ring segments are mounted along the inner surface of the gland assembly 40, FIGS. 5-7. The O-ring 202 is captured on the configured stepped inner face 50. As set forth above, each biasing clip assembly 210 is composed of at least the inner spring clip 216 and the outer spring clip 218. The second outer spring clip 218 is then mounted on the inner spring clip 216 and the bent tab portion 228 is seated within the groove 33 formed in the inner surface of the stationary seal ring. This arrangement pre-mounts or pre-assembles the stationary seal ring with the gland assembly.

The movable spring engaging mechanism 230 is then seated within the gland groove 100 formed on the top surface thereof for each of the gland segments. The movable spring engaging mechanism 230 is initially mounted only partly within the groove in an engaged position such that the surface features 232 are mounted beneath the biasing clip assemblies 210 and such that the bent flat portion 236 is circumferentially spaced away from the axial gland face 66, FIGS. 1, 5 and 10A. The engaged position lifts both the biasing clip assembly and the stationary seal ring, since they are coupled to together, to create a clearance space between the seal faces 21, 31 of the seal rings. This clearance gap thus removes the axial bias from the seal rings of the split mechanical seal 10. This selective removal of the axial biasing force makes it easier for the stationary components of the mechanical seal to be installed about the rotary components that are secured to the shaft. Another advantage of this arrangement is that damage to the seal rings (e.g., the axial seal faces 25, 35 and the seal faces 21, 31) often caused by premature contact between the seal rings can be prevented since the rotary and stationary seal rings are not yet placed in contact with one another.

The stationary seal ring segments 30' and 30" mounted in the seal gland assembly are then concentrically mounted over the shaft 12 and secured together by the O-ring 202. The O-ring 202 applies a radially inward force to the stationary seal ring outer surface 36 sufficient to place the axial sealing faces 35 of each segment in sealing contact with each other.

When the gland assembly 40 and the holder assembly 110 are properly aligned, the gland gasket 76 and the holder gasket 160 are captured in separate gasket grooves formed on opposite sealing faces of the gland and holder segments. This double-capture configuration allows the mechanical seal 10 to withstand higher pressures without degradation of the pressure and fluid seals formed at the segment sealing faces. Additionally, the O-ring 202 forms a pressure-tight and fluid-tight seal between the gland inner surface, e.g. gland second face 50 and first wall 48, and the outer surface 36 of the stationary seal ring 30.

The holder assembly is then rotated a selected amount, for example 90°, so that the splits of the assembled holder assembly are not aligned with the splits of the seal gland assembly.

The gland segments 41,42 are concentrically placed about the holder assembly 110, such that the faces engage, and the rotary and stationary seal rings 20,30 are secured together by the gland screws 90 that are mounted in and positively maintained by the fastener-receiving apertures in the screw housings 80 and 82. The screws 90 cannot be unintentionally removed from the mechanical seal 10 since they are secured to the gland assembly 40 by the fastener-receiving aperture 84 and screw 90. Additionally, mounting the screws 90 does not necessitate rotating the shaft since the screws 90 can be secured from the same or opposite sides of the gland assembly 40.

As the gland segments are brought together as a result of the tightening of the gland screws 90, the bent flat portion 236 of the movable spring engaging mechanism 230 engages the axial end face of the opposed gland segment. As the gland segments are brought closer together, the force applied to the movable spring engaging mechanism 230 via the bent flat portion 236 by the opposed gland segment drives or moves the movable spring engaging mechanism 230 within the gland groove 100 from the engaged position into the disengaged position. In the disengaged position, the movable spring engaging mechanism 230 moves within the groove such that the raised surface features 232 disengages from the biasing clip assemblies, FIGS. 6, 7 and 10B. When disposed into this position, the biasing clip assemblies reapply the axial biasing force to the seal rings. When the axial biasing force is applied to the seal rings, the seal faces 21, 31 of the rotary and stationary seal rings, respectively, are brought into contact with each other. Thus, the simple step of tightening the gland segments together via the gland screws 90 automatically moves the movable spring engaging mechanism 230 from the disengaged position into the engaged position, thus applying the axial biasing force to the seal rings and hence driving the seal faces into sealing contact with each other.

Further, by initially removing the axial biasing force from the stationary seal ring, the seal faces 21, 31 of the seal rings are not brought into premature contact with each other. This helps prevent accidental damage to the seals. The biasing force is automatically applied when the gland segments are tightened together.

Prior to fully securing the gland bolts to the housing 14, those of ordinary skill will readily recognize based on the teachings herein that the shaft 12, the holder assembly 110, and the rotary and stationary seal rings 20, 30 should be centered within the chamber 24. As described above, the detent groove 189 facilitates centering of the rotary seal ring 20. In addition, centering spacers may be optionally be provided along the outer surface of the holder assembly 110 to center the holder within the gland assembly.

The mechanical seal 10 is then finally mounted to the housing 14 by the use of gland bolts. The gland bolts either engage bolt tabs that are conventionally mounted formed along the periphery of the gland or the screw housings 80, 82. The application of this additional axial force to the mechanical seal 10 drives the rotary seal ring, as well as the stationary seal ring, in an axially downward direction (arrow 240) such that the O-ring 188 is forced out of the detent groove 189, FIGS. 6 and 7.

The split mechanical seal 10 of the illustrative embodiments of the invention provide significant advantages over the prior art, including ease of installation of the mechanical seal assembly and functional improvements. For example, the non-flat axial seal faces of the seal rings 20, 30 allow the seal ring segments to self-align during the installation process. The selective removal of the axial biasing force from the seal rings during the initial stages of the installation process makes it significantly easier for the installer to mount and install the mechanical seal, while concomitantly preventing damage to the seal rings by preventing the accidental and premature contact of the seal rings with each other. The present invention also provides for the pre-assembly of the stationary seal ring with the gland assembly and the rotary seal ring with the holder assembly, thus simplifying the installation process.

Moreover, the use of the detent groove enables improved rotary face insertion, with less insertion force required. The insertion force may be reduced by between about 59% and 70%, though the invention is not limited to this range. By lowering the insertion force, the installer is less likely to damage the seal faces upon installation, thereby prolonging the lifetime of the seal components and improving overall operation.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A split mechanical seal for mounting to a housing containing a rotating shaft, comprising
    a gland assembly configured for mounting to the housing and forming a chamber, the gland assembly having a housing that includes an axially outermost top surface having a gland groove formed thereon, wherein the gland groove is formed at least in part by a plurality of circumferentially spaced apart, discrete raised wall portions that extend axially outwardly from the axial outermost top surface, and the axially outermost top surface further has formed therein a plurality of spaced apart, discrete cut-out sections formed into the top surface and extending axially inwardly relative to the top surface and relative to the raised wall portions, wherein the cut-out sections are sized and dimensioned for seating at least a portion of a biasing clip assembly, and wherein the plurality of cut-out portions are alternately disposed between the plurality of raised wall portions within the axially outermost top surface, such that one of the plurality of cut-out sections is disposed between at least two of the plurality of raised wall portions,
   a stationary seal ring seated within the chamber of the gland assembly and coupled thereto, the stationary seal ring having a sealing surface and an opposed axially outer top surface,
   a holder assembly disposed in the chamber and positioned so as to be in a cooperative sealing relationship with the gland assembly, the holder assembly defining a space and capable of rotating with the shaft, and
   a rotary seal ring disposed within the space of the holder assembly and is coupled thereto.

2. The split mechanical seal of claim 1, wherein the raised wall portions are generally equally spaced apart about the circumference of the gland assembly.

3. The split mechanical seal of claim 1, wherein the plurality of raised wall portions comprises a first plurality of discrete raised wall portions arranged along an inner circumference of the axially outermost top surface of the gland assembly and having a first diameter, and a second plurality of discrete raised wall portions arranged along an outer circumference of the axially outermost top surface portion of the gland assembly and having a second diameter, wherein the second diameter is larger than the first diameter.

4. The split mechanical seal of claim 3, wherein the first plurality of raised wall portions are radially aligned with the second plurality of raised wall portions.

5. The split mechanical seal of claim 1, further comprising a biasing member that is coupled to the gland assembly for exerting, in operation, an axially downward biasing force to the stationary seal ring and the rotary seal ring to place the sealing surface of the stationary seal ring in sealing contact with a sealing surface of the rotary seal ring.

6. The split mechanical seal of claim 1, further comprising a biasing clip assembly that is coupled to the gland assembly for exerting, in operation, an axially downward biasing force to the stationary seal ring and the rotary seal ring to place the sealing surface of the stationary seal ring in sealing contact with a sealing surface of the rotary seal ring, wherein a first portion of the biasing clip assembly is sized and configured for seating within at least one of the plurality of discrete cut-out sections and an opposed second portion of the biasing clip assembly is sized and configured for contacting at least one of the plurality of discrete raised wall portions.

7. The split mechanical seal of claim 1, wherein the top surface of the stationary seal ring comprises a plurality of recesses formed therein.

8. The split mechanical seal of claim 7, wherein the stationary seal ring has an inner surface and an outer surface, wherein the inner surface has a continuous groove formed therein adjacent to the top surface.

9. The split mechanical seal of claim 8, wherein the groove is continuous along the inner surface.

10. The split mechanical seal of claim 8, further comprising a biasing clip assembly that is coupled to the gland assembly and the stationary seal ring, the biasing clip assembly having a first end portion that is coupled to the discrete cut-out sections formed into the axially outermost top surface of the gland assembly and a second opposite end portion that seats within and engages one of the plurality of recesses, and wherein the biasing clip assembly is further coupled to the groove formed along the inner surface of the stationary seal ring.

11. The split mechanical seal of claim 1, further comprising a movable spring engaging mechanism sized and configured for seating within the gland groove.

12. The split mechanical seal of claim 11, wherein the movable spring engaging mechanism comprises an arcuate shaped main body having a plurality of spaced apart surface features.

13. The split mechanical seal of claim 12, wherein the movable spring engaging mechanism further comprises a bent portion formed at a terminal end.

14. The split mechanical seal of claim 1, wherein the holder assembly has an inner surface and an opposed outer surface, and wherein the inner surface of the holder assembly comprises a detent groove formed therein and configured for at least partially seating a portion of a sealing element.

15. The split mechanical seal of claim 14, wherein the rotary seal ring includes an outer surface and has a detent groove formed therein for at least partially seating a portion of a sealing element.

16. The split mechanical seal of claim 1, wherein the rotary seal ring comprises
   a first seal ring segment having at least one non-flat, axially extending end face, and
   a second seal ring segment having at least one non-flat, axially extending end face,
   wherein the non-flat axially extending end face of the first seal ring segment is disposed in confronting relationship with the non-flat axially extending end face of the second seal ring segment when assembled, and
   wherein the non-flat end faces when confronting each other are complementary in shape.

17. The split mechanical seal of claim 16, wherein the first seal ring segment comprises first and second non-flat, axially extending end faces, wherein the first non-flat end face has a shape that is different than the shape of the second non-flat end face.

18. A split mechanical seal for mounting to a housing containing a rotating shaft, comprising
   a gland assembly configured for mounting to the housing and forming a chamber,
   a stationary seal ring seated within the chamber of the gland assembly and coupled thereto, the stationary seal ring having
      a sealing surface,
      an axially outer top surface disposed opposite to the sealing surface,
      an inner surface, and
      a continuous groove formed in the inner surface at a position adjacent to the top surface,
   a holder assembly disposed in the chamber and positioned so as to be in a cooperative sealing relationship with the gland assembly, the holder assembly defining a space and capable of rotating with the shaft, and
   a rotary seal ring disposed within the space of the holder assembly and is coupled thereto.

19. The split mechanical seal of claim 18, wherein the gland assembly further comprises a top surface having a gland groove formed thereon, wherein the gland groove is formed at least in part by a raised wall portion that extends axially outwardly from the top surface.

20. The split mechanical seal of claim 19, wherein the raised wall portion comprises a plurality of circumferentially spaced apart, discrete raised wall portions that extend axially outwardly from the top surface.

21. The split mechanical seal of claim 19, further comprising a movable spring engaging mechanism sized and configured for seating within the gland groove.

22. The split mechanical seal of claim 18, wherein a top surface of the stationary seal ring has a plurality of recesses formed therein.

23. The split mechanical seal of claim 22, wherein a top surface of the gland assembly further comprises a biasing member engaging portion formed between adjacent spaced apart, discrete raised wall portions that extend axially outwardly from the top surface.

24. The split mechanical seal of claim 23, wherein the biasing member engaging portion has a cut-out portion formed therein.

25. The split mechanical seal of claim 24, further comprising a biasing member that is coupled to the gland assembly and the stationary seal ring, the biasing member having a first end portion that is coupled to the gland assembly and a second opposite end portion that seats within and engages one of the plurality of recesses formed in the top surface of the stationary seal ring, and wherein the biasing member is further coupled to the continuous groove formed along the inner surface of the stationary seal ring.

26. The split mechanical seal of claim 22, further comprising a biasing member that is capable of being coupled to an axially outermost portion of the gland assembly and to the stationary seal ring.

27. The split mechanical seal of claim 26, wherein the biasing member comprises a biasing clip assembly having
   a first inner spring clip member, and
   a second outer spring clip member that is sized and configured for mounting over the first inner spring clip member.

28. The split mechanical seal of claim 27, wherein the first inner spring clip member and the second outer spring clip member have a generally C-shaped configuration.

29. The split mechanical seal of claim 27, wherein the first inner spring clip member has a first end having a ridge portion formed thereon.

30. The split mechanical seal of claim 29, wherein the ridge portion is adapted to seat within a cut-out portion formed in the gland assembly to couple the biasing clip assembly to the gland when assembled.

31. The split mechanical seal of claim 29, wherein the first inner spring clip member further comprises a bent portion formed at the opposite end of the clip member, wherein the bent portion is adapted to contact one of the plurality of recesses formed in the stationary seal ring to apply an axial biasing force thereto, in operation.

32. The split mechanical seal of claim 27, wherein the second outer spring clip member comprises
   a generally rounded first end portion configured to mount on and engage an outer surface of the first spring clip member, and
   a second end portion disposed opposite to the first end portion, the second end portion having a bent tab portion extending outwardly therefrom,
   wherein the bent tab portion is adapted to engage the groove formed along the inner surface of the stationary seal ring, thus coupling the stationary seal ring to the gland assembly when assembled.

33. The split mechanical seal of claim 18, wherein the gland assembly includes a top surface having a gland groove formed thereon.

34. The split mechanical seal of claim 33, wherein the gland groove is formed at least in part by a plurality of circumferentially spaced apart, discrete raised wall portions that extend axially outwardly from the top surface.

35. The split mechanical seal of claim 18, wherein the stationary seal ring comprises a pair of arcuate stationary seal ring segments.

36. The split mechanical seal of claim 18, wherein the rotary seal ring comprises a pair of arcuate rotary seal ring segments.

37. A split mechanical seal for mounting to a housing containing a rotating shaft, comprising
   a gland assembly configured for mounting to the housing and forming a chamber, wherein the gland assembly comprises a housing having an axially outermost top surface having an arcuately shaped gland groove formed therein, wherein the arcuately shaped gland groove is formed at least in part by a plurality of circumferentially spaced apart, discrete raised wall portions that extend axially outwardly from the axial outermost top surface, and the axially outermost top surface further has formed therein a plurality of spaced apart, discrete cut-out sections formed into the top surface and extending axially inwardly relative to the top surface and relative to the raised wall portions, and wherein the plurality of cut-out portions are alternately disposed between the plurality of raised wall portions within the axially outermost top surface, such that one of the plurality of cut-out sections is disposed between at least two of the plurality of raised wall portions,
   a stationary seal ring seated within the chamber of the gland assembly and coupled thereto, the stationary seal ring having a sealing surface and an opposed axially outer top surface,
   a holder assembly disposed in the chamber and positioned so as to be in a cooperative sealing relationship with the gland assembly, the holder assembly defining a space and capable of rotating with the shaft,
   a rotary seal ring disposed within the space of the holder assembly and is coupled thereto, and
   a movable spring engaging mechanism sized and dimensioned for mounting in the gland groove and movable therein, the movable spring engaging mechanism comprising
   a main body having an arcuate shape, and
   a plurality of spaced apart surface features associated with the main body.

38. The split mechanical seal of claim 37, wherein the movable spring engaging mechanism further comprises a bent portion formed at a terminal end of the main body.

39. The split mechanical seal of claim 37, wherein the gland groove is formed at least in part by a plurality of circumferentially spaced apart, discrete raised wall portions that extend axially outwardly from the top surface.

40. The split mechanical seal of claim 37, further comprising a biasing member coupled to the gland assembly for applying an axial biasing force to at least the stationary seal ring.

41. The split mechanical seal of claim 40, wherein the biasing member comprises a biasing clip assembly having a first inner spring clip member, and a second outer spring clip member that is sized and configured for mounting over the first inner spring clip member, wherein the first inner spring clip member and the second outer spring clip member have a generally C-shaped configuration.

42. The split mechanical seal of claim 40, wherein the movable spring engaging mechanism is movable within the gland groove between an engaged position where one or more of the plurality of surface features engages the biasing member to remove the biasing force applied by the clip assembly to the stationary seal ring, and a disengaged position where the surface feature is removed from contact with the biasing member thereby allowing the biasing clip assembly to apply an axial biasing force to the stationary seal ring.

43. The split mechanical seal of claim 38, wherein the bent portion formed at the terminal end of the main body of the movable spring engaging mechanism is sized and configured to seat within a recess formed in an end face of the gland assembly.

44. The split mechanical seal of claim 1, wherein the gland assembly is free of a bolt-tab groove.

\* \* \* \* \*